(12) United States Patent
McCann et al.

(10) Patent No.: US 8,467,359 B2
(45) Date of Patent: Jun. 18, 2013

(54) METHODS AND APPARATUS TO AUTHENTICATE REQUESTS FOR NETWORK CAPABILITIES FOR CONNECTING TO AN ACCESS NETWORK

(75) Inventors: Stephen McCann, Southampton (GB); Michael Montemurro, Toronto (CA); David Steer, Nepean (CA); Richard Howard Kennedy, Austin, TX (US); Johanna Lisa Dwyer, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 395 days.

(21) Appl. No.: 12/779,822

(22) Filed: May 13, 2010

(65) Prior Publication Data

US 2011/0280180 A1    Nov. 17, 2011

(51) Int. Cl.
*H04W 4/00*    (2009.01)
(52) U.S. Cl.
USPC .......................................................... 370/338
(58) Field of Classification Search
None
See application file for complete search history.

(56) References Cited

U.S. PATENT DOCUMENTS

| | | | |
|---|---|---|---|
| 5,796,727 A | 8/1998 | Harrison et al. |
| 6,081,826 A | 6/2000 | Masuoka et al. |
| 6,393,261 B1 | 5/2002 | Lewis |
| 6,643,517 B1 | 11/2003 | Steer |
| 6,845,246 B1 | 1/2005 | Steer |
| 6,950,419 B1 | 9/2005 | Park et al. |
| 6,950,876 B2 | 9/2005 | Bright et al. |
| 7,395,083 B2 | 7/2008 | Buckley |
| 7,551,892 B1 | 6/2009 | Elliott |
| 7,606,202 B2 | 10/2009 | Marathe et al. |
| 8,055,306 B2 | 11/2011 | Li |
| 2002/0029108 A1 | 3/2002 | Liu et al. |
| 2002/0081995 A1 | 6/2002 | Leppinen et al. |
| 2002/0115465 A1 | 8/2002 | Komatsu |
| 2002/0136226 A1 | 9/2002 | Christoffel et al. |
| 2002/0169883 A1* | 11/2002 | Bright et al. .................. 709/230 |
| 2002/0183060 A1 | 12/2002 | Ko et al. |
| 2002/0191575 A1 | 12/2002 | Kalavade et al. |
| 2002/0198849 A1 | 12/2002 | Piikivi |
| 2003/0026223 A1 | 2/2003 | Eriksson et al. |
| 2003/0028763 A1 | 2/2003 | Malinen et al. |

(Continued)

FOREIGN PATENT DOCUMENTS

| | | |
|---|---|---|
| CA | 2244366 | 3/1999 |
| EP | 1096728 A2 | 5/2001 |

(Continued)

OTHER PUBLICATIONS

"Analysis of Network Selection Methods," 3GPP TSG-SA WG2 meeting #32, San Diego, California, USA, May 12, 2003, 2 pages.

(Continued)

*Primary Examiner* — Clemence Han
(74) *Attorney, Agent, or Firm* — Hanley, Flight and Zimmerman, LLC

(57) ABSTRACT

Example methods and apparatus to authenticate requests for network capabilities for connecting to an access network are disclosed. A disclosed example method involves receiving a request at a first access network. The request requests network connectivity information for connecting a wireless terminal to a second access network. The example method also involves encapsulating the request in an authentication frame. The authentication frame indicates the request as a white space protocol frame. The authentication frame is sent to a database addressed in the request.

21 Claims, 13 Drawing Sheets

U.S. PATENT DOCUMENTS

| | | |
|---|---|---|
| 2003/0031148 A1 | 2/2003 | Schmidt et al. |
| 2003/0119481 A1 | 6/2003 | Haverinen et al. |
| 2003/0133421 A1 | 7/2003 | Sundar et al. |
| 2003/0134650 A1 | 7/2003 | Sundar et al. |
| 2004/0066756 A1 | 4/2004 | Ahmavaara et al. |
| 2004/0181692 A1 | 9/2004 | Wild et al. |
| 2005/0021959 A1 | 1/2005 | Tsushima et al. |
| 2005/0059397 A1 | 3/2005 | Zhao |
| 2005/0094593 A1 | 5/2005 | Buckley |
| 2005/0232209 A1 | 10/2005 | Buckley et al. |
| 2006/0233198 A1 | 10/2006 | Kim et al. |
| 2006/0268802 A1 | 11/2006 | Faccin |
| 2007/0047491 A1 | 3/2007 | Dutta et al. |
| 2007/0070935 A1 | 3/2007 | Prakash et al. |
| 2007/0189218 A1 | 8/2007 | Oba et al. |
| 2007/0204155 A1 | 8/2007 | Dutta et al. |
| 2007/0211676 A1 | 9/2007 | Sharma et al. |
| 2007/0213046 A1 | 9/2007 | Li et al. |
| 2007/0224988 A1 | 9/2007 | Shaheen |
| 2008/0069065 A1 | 3/2008 | Wu et al. |
| 2008/0070544 A1 | 3/2008 | Lior |
| 2008/0151796 A1 | 6/2008 | Jokela |
| 2008/0276303 A1 | 11/2008 | Gast |
| 2008/0287141 A1 | 11/2008 | Vogel et al. |
| 2008/0298333 A1 | 12/2008 | Seok |
| 2008/0310366 A1 | 12/2008 | Oba et al. |
| 2009/0010399 A1 | 1/2009 | Kim et al. |
| 2009/0022076 A1 | 1/2009 | Canpolat et al. |
| 2009/0046657 A1 | 2/2009 | Kim et al. |
| 2009/0225731 A1 | 9/2009 | Kneckt et al. |
| 2009/0232042 A1 | 9/2009 | Kneckt et al. |
| 2009/0245133 A1 | 10/2009 | Gupta et al. |
| 2009/0245199 A1 | 10/2009 | Pathan et al. |
| 2009/0268652 A1 | 10/2009 | Kneckt et al. |
| 2009/0274094 A1 | 11/2009 | Engwer |
| 2009/0279449 A1 | 11/2009 | Kneckt et al. |
| 2009/0298522 A1 | 12/2009 | Chaudhri et al. |
| 2010/0008337 A1 | 1/2010 | Bajko |
| 2010/0034097 A1 | 2/2010 | Nitta et al. |
| 2010/0046440 A1 | 2/2010 | Singh |
| 2010/0146272 A1 | 6/2010 | Centonza et al. |
| 2010/0153001 A1* | 6/2010 | Bauchot et al. ............... 701/201 |
| 2010/0198952 A1 | 8/2010 | Kneckt et al. |
| 2010/0246506 A1* | 9/2010 | Krishnaswamy ............. 370/329 |
| 2010/0255794 A1* | 10/2010 | Agnew ............................. 455/77 |
| 2010/0265871 A1* | 10/2010 | Ko et al. ........................ 370/315 |
| 2010/0275249 A1 | 10/2010 | McCann et al. |
| 2010/0323715 A1 | 12/2010 | Winters |
| 2011/0143761 A1* | 6/2011 | Uusitalo et al. ............... 455/450 |
| 2011/0164596 A1 | 7/2011 | Montemurro et al. |
| 2011/0250916 A1 | 10/2011 | Li et al. |
| 2012/0165056 A1* | 6/2012 | Kim et al. ..................... 455/509 |

FOREIGN PATENT DOCUMENTS

| | | |
|---|---|---|
| WO | 2004/064306 | 7/2004 |
| WO | 2004/077753 | 9/2004 |
| WO | 2005/027556 | 3/2005 |
| WO | 2005/094011 | 10/2005 |
| WO | 2006/089847 | 8/2006 |
| WO | 2007089111 | 8/2007 |
| WO | 2008147130 | 12/2008 |
| WO | 2009005282 | 1/2009 |
| WO | 2009/018300 | 2/2009 |
| WO | 2009/027853 | 3/2009 |
| WO | 2009/032554 | 3/2009 |
| WO | 2009031197 | 3/2009 |
| WO | 2009/078540 | 6/2009 |
| WO | 2009/156554 | 12/2009 |
| WO | 2011/007338 | 1/2011 |
| WO | 2011/023206 | 3/2011 |
| WO | 2011/070224 | 6/2011 |

OTHER PUBLICATIONS

"WLAN Access Network Selection," 3GPP TSG-SA WG2 meeting #35, Bangkok, Thailand, Oct. 27, 2003, 3 pages.

Haverinen et al. "Cellular Access Control and Charging Mobile Operator Wireless Local Area Networks," Dec. 2002, IEEE Productions, 10 pages.

Haverinen et al. "EAP SIM Authentication," Network Working Group, Online 1, Oct. 27, 2003, pp. 1-72.

IEEE P802.11af™/D0.02, "Draft Amendment to IEEE std 802.11™—2007," IEEE 802 Committee, May 2010, 33 pages.

Aboba et al., "The Network Access Identifier," Network Working Group, Request for Comments (RFC) 4282, Dec. 2005, 16 pages.

Berners-Lee et al., "Uniform Resource Identifier (URI): Generic Syntax," Network Working Group, Request for Comments (RFC) 3986, Jan. 2005, 61 pages.

International Standard ISO/IEC 8802.11, "Information technology—Telecommunications and information exchange between systems—Local and metropolitan area networks—Specific requirements; Part 11: Wireless LAN Medium Access Control (MAC) and Physical Layer (PHY) specifications; Amendment 6: Medium Access Control (MAC) Security Enhancements," ISO/IEC 8802-11:2005/Amd.6:2006(E), IEEE STD 802.11i-2004 (Amendment to IEEE Std 802.11-1999), Dec. 15, 2006, 197 pages.

Mika Kasslin, "System Design Document," IEEE 802.19-10/0055r02, IEEE P802.19 Wireless Coexistence, Mar. 18, 2010, 12 pages.

"Universal Mobile Telecommunications System (UMTS); LTE; 3GPP System to Wireless Local Area Network (WLAN) Interworking; WLAN User Equipment (WLAN UE) to Network Protocls; Stage 3 (3GPP TS 24.234 version 8.2.0 Release 8)," ETSI TS 124 234, V8.2.0, Apr. 2009, 40 pages.

Mark Austin, "Draft Jul. 2009 Minutes," IEEE P802.19-09-0052-00-0000, Jul. 2009, 14 pages [retrieved from Internet: https://mentor.ieee.org/802.19/dcn/09/F19-09-0052-02-0000-ieee-p802-19-july-2009-minutes-draft.docx].

"IEEE Standard for Local and Metropolitan Area Networks—Part 21: Media Independent Handover Services," IEEE Computer Society, IEEE Std 802.21, Jan. 21, 2009, 323 pages.

Neel et al., "An Overview of Cognitive Radio and Intelligent Transportation Systems," Jun. 11, 2009,16 pages [retrieved from Internet; www.crtwireless.com/fies/CR_ITS_6_11_09.pdf].

"Draft Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 5: TV White Spaces Operation," IEEE 802 Committee, IEEE P802.11af/D0.01, Apr. 2010, 15 pages.

"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications," 802.11 Working Group, IEEE Draft P802.11-REVmb/D3.0, Mar. 2010, 2228 pages.

"Draft Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 7: Interworking with External Networks," Working Group of the 802 Committee, IEEE P802.11u/D8.0, Jul. 2009, 196 pages.

"Draft Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 7: Interworking with External Networks," Working Group of the 802 Committee, IEEE P802.11u/D9.0, Apr. 2010, 200 pages.

Cam-Winget et al., "EAP Type-Length-Value Container," Network Working Group, Internet-Draft, Jan. 5, 2010, 11 pages.

Kennedy et al., "TVWS PAR and 5C," IEEE P802.11, Wireless LANs, IEEE 802.11-09/0934r0, Sep. 1, 2009, 8 pages.

47 CFR 15.713: TV bands database. Text from: Code of Federal Regulations, Oct. 1, 2009 [retrieved from Internet: http://www.gpo.gov/fdsys/pkg/CFR-2009-title47-vol1/xml/CFR-2009-title47-vol1-sec15-713.xml] 4 pages.

Canpolat et al., "TGu Single GAS Protocol," IEEE P802.11, Wireless LANS, IEEE 802.11-10/0266r9, Mar. 18, 2010, 71 pages.

Celebi et al., "Utilization of Location Information in Cognitive Wireless Networks," IEEE Wireless Communications, Aug. 1, 2007, 8 pages.

Federal Communications Commission, "Second Report and Order and Memorandum Opinion and Order," FCC 08-260, Nov. 14, 2008, [retrieved from http://hraunfoss.fcc.gov/edocs_public/attachmatch/FCC-08-260A1.pdf] 130 pages.

Electronic Code of Federal Regulations, FCC Part 15 Subpart H—15.701 Scope, [retrieved from http://ecfr.gpoaccess.gov/cgi/t/text/text-idx?c=ecfr&rgn=div5&view=text&node=47:1.0.1.1.14&idno=47] 10 pages.

Gurney et al., "Geo-Location Database Techniques for Incumbent Protection in the TV White Space," New Frontiers in Dynamic Spectrum Access Networks, 2008. DYSPAN 2008. 3RD IEEE Symposium on, IEEE, Piscataway, NJ, USA, Oct. 14, 2008, pp. 1-9.

Patil et al., "Protocol to Access White Space Database: Problem Statement and Requirements," Individual Submission, Internet-Draft, Intended Status: Informational, Feb. 22, 2011, 11 pages.

Murty et al.,"SenseLess: A Database Driven White Spaces Network," Microsoft Research Technical Report MSR-TR-2010-127, Sep. 20, 2010, pp. 1-21.

United States Patent and Trademark Office, "Non-Final Office Action," issued in connection with U.S. Appl. No. 12/779,809, on May 29, 2012 (17 pages).

United States Patent and Trademark Office, "Final Office Action," issued in connection with U.S. Appl. No. 12/779,809, on Dec. 5, 2012 (16 pages).

United States Patent and Trademark Office, "Non-Final Office Action," issued in connection with U.S. Appl. No. 12/779,820, on Apr. 5, 2012 (14 pages).

United States Patent and Trademark Office, "Final Office Action," issued in connection with U.S. Appl. No. 12/779,820, on Nov. 16, 2012 (14 pages).

Patent Cooperation Treaty, "International Search Report," issued by the International Searching Authority in connection with PCT application No. PCT/US2011/034992, mailed Nov. 15, 2011 (4 pages).

Patent Cooperation Treaty, "Written Opinion of the International Searching Authority," issued by the International Searching Authority in connection with PCT/US2011/034992, mailed Nov. 15, 2011 (9 pages).

Patent Cooperation Treaty, "International Preliminary Report on Patentability," issued by the International Searching Authority in connection with PCT/US2011/034992, mailed Nov. 13, 2012 (10 pages).

Patent Cooperation Treaty, "International Search Report," issued by the International Searching Authority in connection with PCT application No. PCT/US2011/034999, mailed Aug. 5, 2011 (4 pages).

Patent Cooperation Treaty, "Written Opinion of the International Searching Authority," issued by the International Searching Authority in connection with PCT/US2011/034999, mailed Aug. 5, 2011 (11 pages).

Patent Cooperation Treaty, "International Preliminary Report on Patentability," issued by the International Searching Authority in connection with PCT/US2011/034999, mailed Nov. 13, 2012 (10 pages).

Patent Cooperation Treaty, "International Search Report," issued by the International Searching Authority in connection with PCT application No. PCT/US2011/035004, mailed Aug. 19, 2011 (4 pages).

Patent Cooperation Treaty, "Written Opinion of the International Searching Authority," issued by the International Searching Authority in connection with PCT/US2011/035004, mailed Aug. 19, 2011 (8 pages).

Patent Cooperation Treaty, "International Preliminary Report on Patentability," issued by the International Searching Authority in connection with PCT/US2011/035004, mailed Nov. 13, 2012 (7 pages).

Funk et al., "Extensisble Authentication Protocol Tunneled Transport Layer Security Authenticated Protocol Version 0 (EAP-TTLSv0)," Network Working Group, Request for Comments 5281, Aug. 2008, 52 pages.

Cam-Winget et al., "The Flexible Authentication via Secure Tunneling Extensible Authentication Protocol Method (EAP-FAST)," Network Working Group, Request for Comments 4851, May 2007, 64 pages.

Aboba et al., "Extensible Authentication Protocol (EAP) Key Management Framework," Network Working Group, Request for Comments 5247, Aug. 2008, 79 pages.

Aboba et al., "Extensible Authentical Protocol (EAP)," Network Working Group, Request for Comments 3748, Jun. 2004, 67 pages.

"3rd Generaion Partnership Project; Technical Specification Group Core Network and Terminals; Access Network Discovery and Selection Function (ANDSF) Management Object (MO) (Release 9)," 3GPP TS 24.312, V9.1.0, Mar. 2010, 85 pages.

Hilt et al., "A Framework for Session Initiation Protocol (SIP) Session Policies," SIPPING Working Group, Internet-Draft, Nov. 1, 2008, [retrieved from http://tools.ietf.org/html/draft-ietf-sip-session-policy-framework-05 on Dec. 27, 2010], 36 pages.

"Extensible Authentication Protocol," From Wikipedia, the free encyclopedia, [retrieved from http://en.wikipedia.org/wiki/Extensible_Authenitcation_Protocol on Dec. 27, 2010], Dec. 8, 2010, 8 pages.

"Extensible Authentication Protocol," From Wikipedia, the free encyclopedia, [retrieved from http://en.wikipedia.org/w/index.php?title=Extensible_Authentication_Protocol
&oldid=297168642 on Dec. 27, 2010], Jun. 18, 2009, 7 pages.

Petrie et al., "A Framework for Session Initiation Protocol User Agent Profile Delivery," SIPPING, Internet-Draft, Feb. 13, 2008, [retrieved from http://tools.ietf.org/html/draft-ietf-sipping-config-framweork-15 on Dec. 27, 2010], 56 pages.

Hilt et al., "A User Agent Profile Data Set for Media Policy," SIPPING Working Group, Internet-Draft, Jul. 12, 2008, [retrieved from http://tools.ietf.org/html/draft-ietf-sipping-media-policy-dataset-06 on Dec. 27, 2010], 36 pages.

Hilt et al., "A Framework for Session Initiation Protocol (SIP) Session Policies," SIPPING Working Group, Internet-Draft, Apr. 27, 2008, [retrieved from http://tools.ietf.org/html/draft-ietf-sip-session-policy-framework-03 on Dec. 27, 2010], 36 pages.

Hilt et al., "A Session Initiation Protocol (SIP) Event Package for Session-Specific Session Policies," SIPPING Working Group, Internet-Draft, Jul. 12, 2008, [retrieved from http://tools.ietf.org/id/draft-ietf-sipping-policy-package-05],37 pages.

Hilt et al., "A Session Initiation Protocol (SIP) Event Package for Session-Specific Session Policies," SIPPING Working Group, Internet-Draft, Jan. 28, 2007, [retrieved from http://tools.ietf.org/html/draft-ietf-sipping-policy-package-03 on Dec. 27, 2010],18 pages.

802.11 Working Group of the 802 Committee, "Draft Standard for Information Technology—Telecommunications and information exchange between systems—Local and metropolitan area networks—Specific Requirements," IEEE P802.11u/D7.0, published Jun. 2009, IEEE Standards, New York, NY, USA, 197 pages.

Rigney et al., "Remote Authentication Dial in User Service (RADIUS)," Network Working Group, Request for Comments: 2865, Jun. 2000, 77 pages.

Calhoun et al., "Diameter Base Protocol," Network Working Group, Request for Comments: 3588, Sep. 2003, 147 pages.

Kawatsura, Y., "Secure Electronic Transaction (SET) Supplement for the v1.0 Internet Open Trading Protocol (IOTP)," Network Working Group, Request for Comments: 3538, Jun. 2003, 57 pages.

Cam-Winget et al., "Dynamic Provisioning Using Flexible Authentication via Secure Tunneling Extensible Authentication Protocol (EAP-FAST)," Network Working Group, Request for Comments: 5422, Mar. 2009, 40 pages.

Roach, A.B., "Session Initiation Protocol (SIP)—Specific Event Notification," Network Working Group, Request for Comments: 3265, Jun. 2002, 38 pages.

Schulzrinne, H., "CIPID: Contact Information for the Presence Information Data Format," Network Working Group, Request for Comments: 4482, Jul. 2006, 12 pages.

Rosenberg et al., "SIP: Session Initiation Protocol," Network Working Group, Request for Comments: 3261, Jun. 2002, 270 pages.

Blunk et al., "PPP Extensible Authentication Protocol (EAP)," Network Working Group, Request for Comments: 2284, Mar. 1998, 16 pages.

Townsley et al., "Layer Two Tunneling Protocol 'L2TP'," Network Working Group, Request for Comments: 2661, Aug. 1999, 81 pages.

Stanley et al., "Extensible Authentication Protocol (EAP) Method Requirements for Wireless LANs," Network Working Group, Request for Comments: 4017, Mar. 2005, 12 pages.

Kempf et al., "Distributing a Symmetric Fast Mobile Ipv6 (FMIPv6) Handover Key Using Secure Neighbor Discovery (SEND)," Network Working Group, Request for Comments: 5269, Jun. 2008, 15 pages.

Kempf et al., "Distributing a Symmetric Fast Mobile IPv6 (FMIPv6) Handover Key using Secure Neighbor Discovery (SEND)," Network Working Group, Request for Comments: 5108, Jan. 2008, 15 pages.

Haverinen et al., "Extensible Authentication Protocol Method for Global System for Mobile Communications (GSM) Subscriber Identity Modules (EAP-SIM); rfc4186.txt", IETF Standard, Internet Engineering Task Force, IETF, CH, Jan. 2006, 92 pages.

Arkko et al., "Network Discovery and Selection Problem," Request for Comments (RFC) 5113, IETF Standard, Internet Engineering Task Force, IETF, Jan. 2008, XP015055182, ISSN: 0000-0003, 39 pages.

Canpolat et al., "IEEE 802.11u Network Selection & MIH Support," Sep. 19, 2006, pp. 1-19, XP002478803 [Retrieved from: URL: https://mentor.ieee.org/802.11/dcn/06/11-06-1069-00-000u-tgu-overview.ppt ].

802.11 Working Group of the 802 Committee, "Draft Standard for Information Technology—Telecommunications and information exchange between systems—Local and metropolitan area networks—Specific Requirements," IEEE P802.11u/D6.0, published Apr. 9, 2009, IEEE Standards, New York, NY, USA, 208 pages.

Lloyd et al., "PPP Authentication Protocols," Network Working Group, Request for Comments (RFC) 1334, Oct. 1992, 16 pages.

Simpson, W., "PPP Challenge Handshake Authentication Protocol (CHAP)," Network Working Group, Request for Comments (RFC) 1994, Aug. 1996, 13 pages.

Zorn et al., "Microsoft PPP CHAP Extensions," Network Working Group, Request for Comments (RFC) 2433, Oct. 1998, 20 pages.

Zorn, G., "Microsoft PPP CHAP Extensions, Version 2," Network Working Group, Request for Comments (RFC) 2759, Jan. 2000, 20 pages.

* cited by examiner

BEACON

| OCTETS: | 2 | 1 | VARIABLE | VARIABLE | VARIABLE | VARIABLE |
|---|---|---|---|---|---|---|
| | REQUEST ID | REQUEST TYPE | REQUEST COMMAND INFORMATION | LOCATION | DATABASE ADDRESS | TIME |
| | 802 | 804 | 806 | 808 | 810 | 812 |

DATABASE REQUEST FRAME

FIG. 8

| REQUEST TYPE VALUE | DEFINITION |
|---|---|
| 1 | DATABASE QUERY |
| 2 | DATABASE UPDATE |
| 3 | DATABASE UPLOAD |
| 4 | DATABASE ACCESS PARAMETERS |
| 5 | DATABASE MODIFICATION |
| 6 | DATABASE VALIDATION REQUEST |
| 7 | DATABASE REG AND CH REQUEST |
| 8 | SECURITY PARAMETER REQUEST |

REQUEST TYPE VALUES

FIG. 9

RADIUS TIME-LENGTH-VALUE (TLV) STRUCTURE

DIAMETER ATTRIBUTE-VALUE-PAIR (AVP) STRUCTURE

METHODS AND APPARATUS TO AUTHENTICATE REQUESTS FOR NETWORK CAPABILITIES FOR CONNECTING TO AN ACCESS NETWORK

FIELD OF THE DISCLOSURE

The present disclosure relates generally to network communications and, more particularly, to methods and apparatus to authenticate requests for network capabilities for connecting to an access network.

BACKGROUND

Wireless network deployments, such as wireless local area networks (WLANs), allow wireless terminals to access network and Internet services when within proximity of wireless communication signals of those wireless networks. Sometimes, users of wireless terminals move between different locations that offer different types of access network technologies. In such instances, wireless terminals capable of operating with different access network technologies can establish communications with such different technologies when moved between different locations. When moved to a new location, a wireless terminal must determine whether an access network is available and identify the information required to establish a connection with the available access network.

BRIEF DESCRIPTION OF THE DRAWINGS

FIG. 8 depicts an example database request frame that may be used in connection with the database query frame of FIGS. 2 and 4 to send requests to the TVWS database.

FIG. 9 depicts an example request type values data structure including different request types that can be indicated in the database request frame of FIG. 8 for different types of requests communicated to the TVWS database.

DETAILED DESCRIPTION

Figure 1:
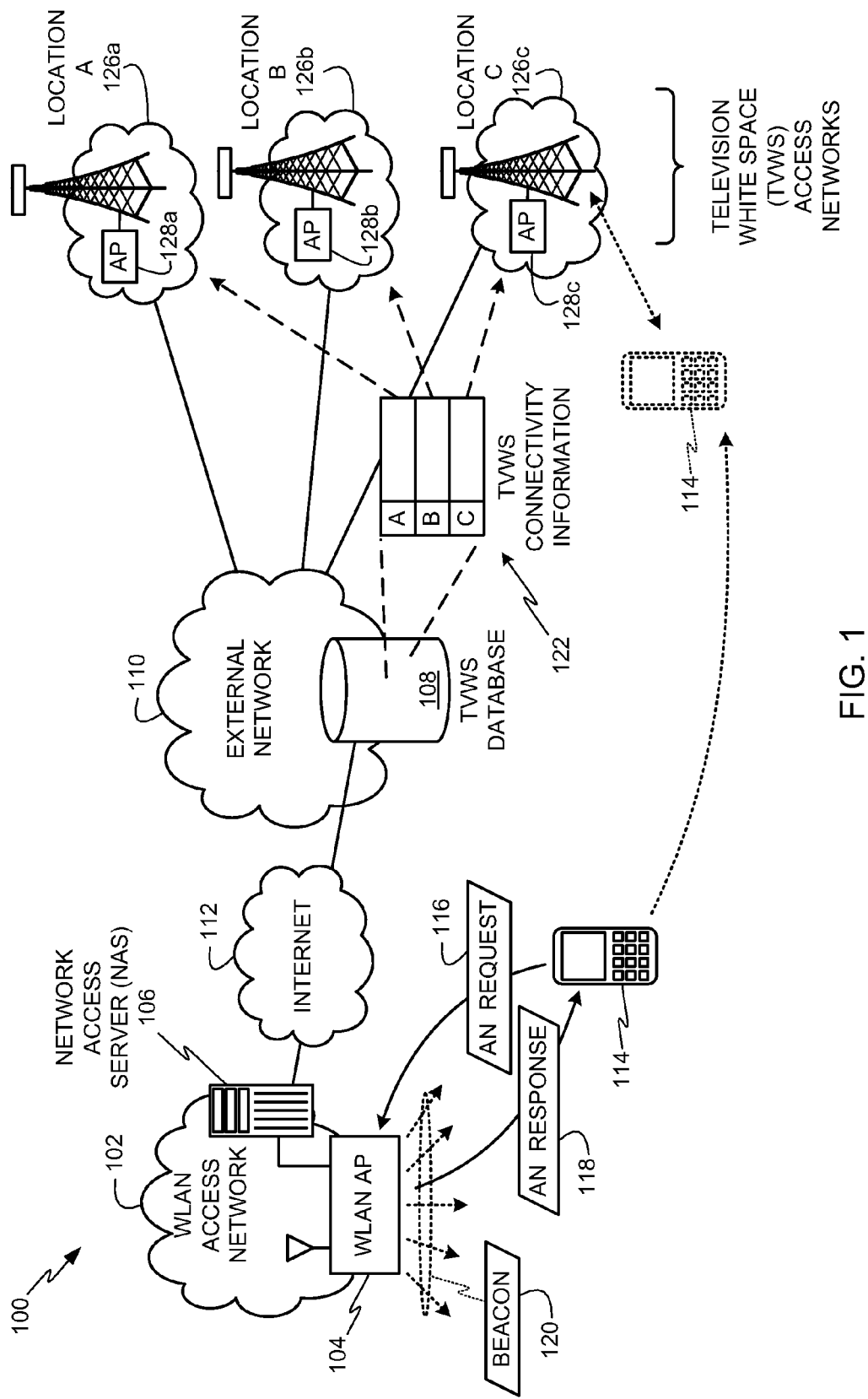
FIG. 1 depicts an example communication network in which a wireless terminal retrieves network connectivity information from a television whitespace (TVWS) database for connecting to TVWS access networks.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used to access (e.g., retrieve network connectivity information) a database storing network information pertaining to a plurality of access networks in different locations. The example methods and apparatus described herein can be used in connection with mobile communication devices, mobile computing devices, or any other device capable of communicating wirelessly with a wireless network. Such devices, also referred to as terminals, wireless terminals, TVWS devices, TV band devices (TVBDs), or user equipment (UE), may include mobile smart phones (e.g., a BLACKBERRY® smart phone), wireless personal digital assistants (PDA), laptop/notebook/netbook computers with wireless adapters, etc. The example methods and apparatus are described herein in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including, but not limited to, other WLAN standards, personal area network (PAN) standards, wide area network (WAN) standards, wireless metropolitan area network (WMAN) standards (e.g., IEEE® 802.16 or WiMAX networks), wireless regional area network (WRAN) standards (e.g., IEEE® 802.22), or cellular communication standards.

The example methods and apparatus described herein can be used to obtain information about connecting with television white space (TVWS) access networks before attempting to connect with such networks. A TVWS access network is a telecommunications network through which wireless terminals (e.g., TVWS devices or TVBDs having radio transceivers that operate in television bands) connect to information and services across one or more other networks (e.g., the Internet). A TVWS network allows wireless terminal connectivity and communications via unused channels between active digital television (DTV) (or analog television) channels. Alternatively, the example methods and apparatus described herein may also be used in connection with other white space technologies that use frequency bands of other, non-television, systems such as military communication systems, terrestrial broadcast radio systems, etc.

To store and provide information about TVWS connectivity capabilities and/or requirements at different locations supporting TVWS access networks, a networked TVWS database is hosted in an external network accessible through one or more types of access networks including wireless local area networks (WLANs) and TVWS access networks. In some example implementations, the TVWS database may provide capabilities/requirements information such as connection frequencies, available bandwidth, power, policy, locations, timing, and access rights to channels allocated for TVWS access network connectivity. This information can be provided for different locations in which TVWS access networks are available.

The example methods and apparatus described herein can be advantageously used to inform wireless terminals of the types of TVWS connectivity that are available in different locations before the wireless terminal attempts a TVWS connection at those locations. For example, a person travelling between different locations (e.g., different cities, states, countries, etc.) may, in advance, query a TVWS database about TVWS access network availability and connectivity capabilities/requirements at a future destination, so that upon arrival at the destination, the person's TVBD can connect to the available TVWS access network based on the retrieved TVWS access network connectivity capabilities/requirements information.

In the illustrated examples described herein, example wireless terminals used to connect with TVWS access networks are dual-mode wireless terminals having wireless capabilities for connecting to the TVWS access networks (using TVWS protocols and TVWS frequencies) and for connecting to an IEEE® 802.11 WLAN access network. In other example implementations, the example methods and apparatus described herein may be used by wireless terminals having TVWS connectivity capabilities in addition to capabilities for connecting to access network technologies other than IEEE® 802.11 WLAN access networks. Such other access network technologies may include both wireless and wired technologies such as cellular, Ethernet LAN and universal serial bus (USB), for example.

A dual-mode wireless terminal can be advantageously used to connect to a TVWS database via a non-TVWS access network (e.g., a WLAN access network) to retrieve information about TVWS access network connectivity capabilities/requirements before attempting to connect to a TVWS access network. In this manner, if TVWS connectivity is not available or not possible, a wireless terminal need not consume battery power in attempting to connect to a TVWS access network when such an access network is not available or such a connection is not possible.

Although the example methods and apparatus are described herein as accessing a TVWS database to access information about, for example, accessing TVWS access networks, the example methods and apparatus may similarly be used to access databases storing information (e.g., information servers) about accessing and connecting to other types of networks (e.g., WLAN access networks, cellular networks, etc.), including networks that use white space in bands other than TV bands, as regulatory domains make them available. In other example implementations, the information message exchanges described herein between a TVBD and a TVWS database may be implemented using other schemes such as email, short messaging service (SMS), and instant messaging.

Turning now to FIG. 1, an example communication network 100 in which the example methods and apparatus described herein may be implemented is shown. As shown in FIG. 1, the example communication network 100 includes a WLAN access network 102 having a WLAN access point (AP) 104 and a network access server (NAS) 106 that provide access to a TVWS database 108 in an external network 110. The NAS 106 determines whether wireless terminals are permitted to gain network access and, thus, communicate with the WLAN access network 102 and other networks (e.g., the external network 110). In the illustrated examples described herein, the NAS 106 also processes communications sent by a wireless terminal 114 to the WLAN AP 104 intended for delivery to the TVWS database 108 and forwards such communications or related portions (e.g., TVWSP frames discussed below in connection with FIGS. 6-8) to the TVWS database 108. In addition, the NAS 106 receives responses from the TVWS database 108 and forwards the response information (e.g., via TVWSP frames of FIGS. 6, 10, and 11) to the wireless terminal 114 through the WLAN AP 104.

In the illustrated example of FIG. 1, the external network 110 is a network that is logically separate from the WLAN access network 102 or logically separate from any other access network through which wireless terminals connect to the TVWS database 108. In the illustrated example of FIG. 1, connectivity to the TVWS database 108 is available through the Internet 112. However, in other example implementations, connectivity to the TVWS database 108 via an access network (e.g., the WLAN access network 102) may be available through a private network or other networking environment other than the Internet 112 including, for example, an intranet, an enterprise network, or a mobile operator's core network. In some example implementations, the TVWS database 108 may be distributed between different regions, with a hierarchy of databases that are managed and synchronized.

Figure 14:
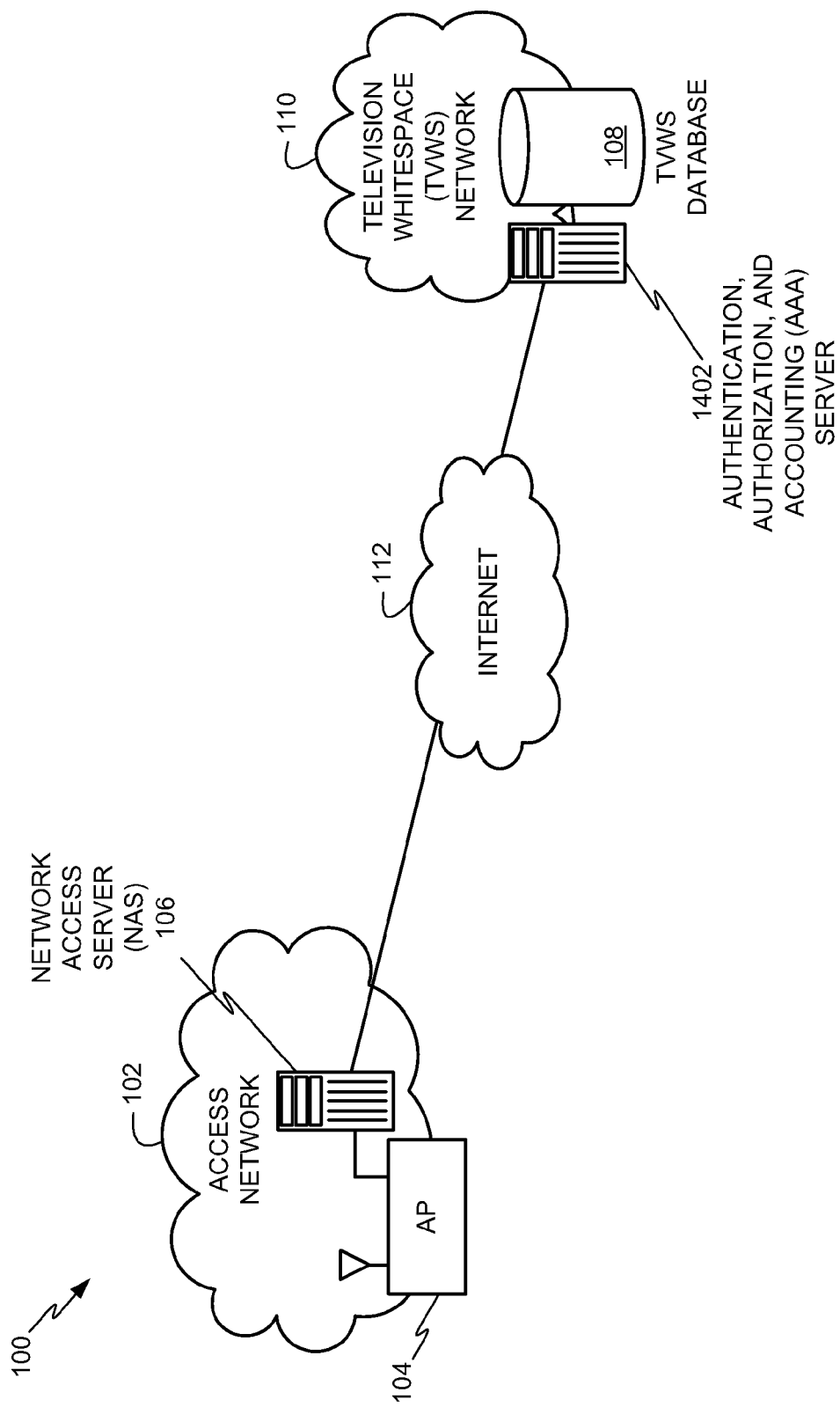
FIG. 14 depicts another example communication network in connection with an authentication, authorization, and accounting (AAA) server.

In some example implementations, the TVWS database 108 may be 'open' such that authentication or authorization is not required. In such instances, an authentication, authorization, and accounting (AAA) server (e.g., a RADIUS or Diameter server) is not required, as in the network configuration of FIG. 1. When an AAA server is not used, the NAS 106 may employ a lightweight directory access protocol (LDAP) to exchange communications with the TVWS database 108. In other example implementations, the TVWS database 108 may not be 'open' and an AAA server (or a home location register (HLR)) may be used to authenticate and authorize users to access the TVWS database 108. Such an example network configuration including an AAA server is shown in FIG. 14. Example implementations for using AAA server-based communications in connection with the example methods and apparatus described herein are discussed below in connection with FIGS. 14-16.

Figure 2:
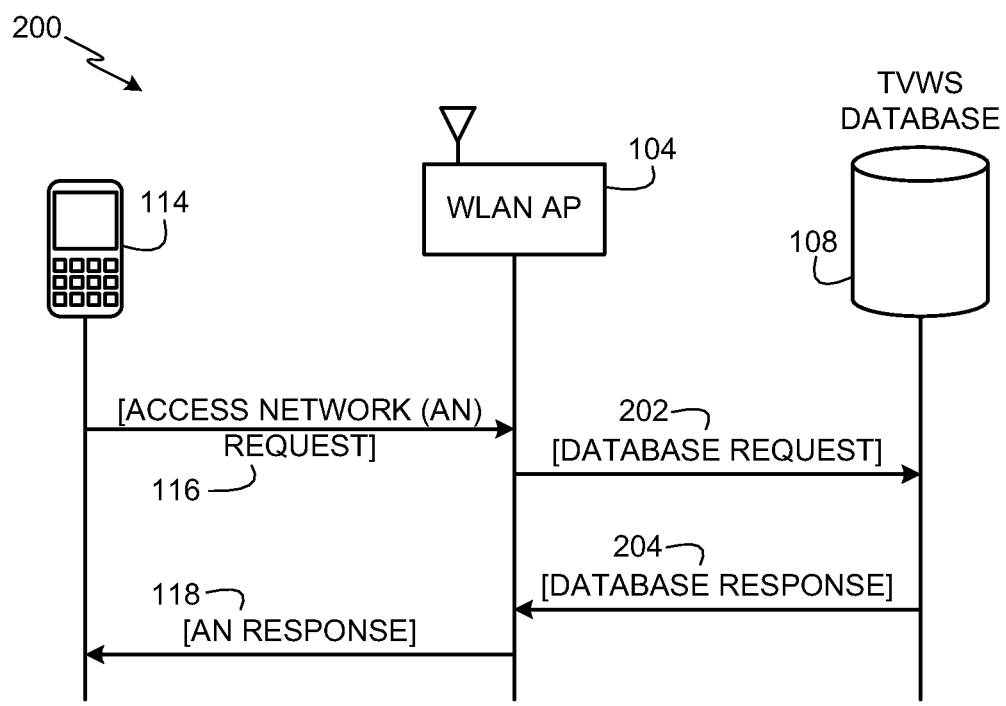
FIG. 2 depicts an example communication exchange between a wireless terminal, a wireless local area network (WLAN) access point (AP), and a TVWS database of FIG. 1 to access information in the TVWS database.
Figure 4:
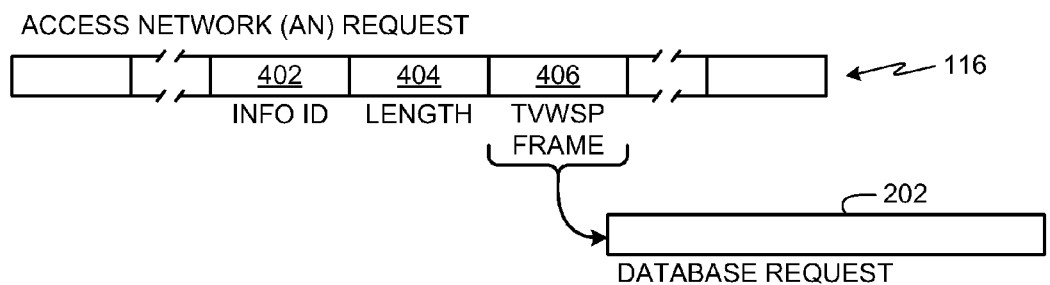
FIG. 4 depicts an example access network request frame and a database query frame of FIG. 2.
Figure 5:
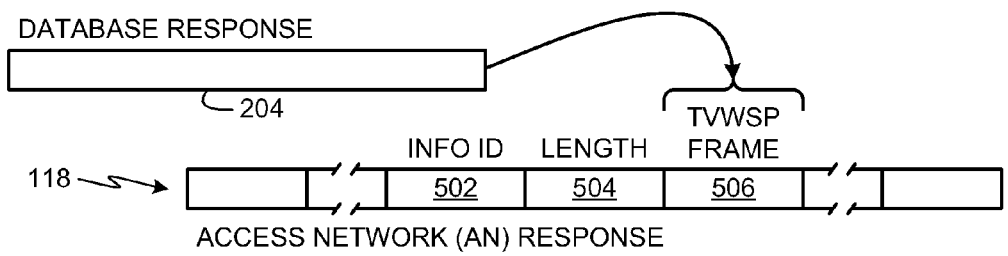
FIG. 5 depicts an example database response frame and an access network response frame of FIG. 2.

As shown in FIG. 1, to communicate with the TVWS database 108, a wireless terminal 114 connects to the WLAN AP 104. In the illustrated examples described herein, the wireless terminal 114 includes a station (i.e., a STA), while the WLAN AP 104 includes an AP STA. The wireless terminal 114 can use an access network (AN) request message 116 to query the TVWS database 108 through the WLAN AP 104 (and the NAS 106). A response from the TVWS database 108 sent to the WLAN access network 102 (through the NAS 106) can be communicated by the WLAN AP 104 to the wireless terminal 114 through an AN response message 118. The messaging exchange between the wireless terminal 114, the WLAN AP 104, and the TVWS database 108 is shown in FIG. 2. The formats or structures of the request message 116 and the response message 118 are shown in FIGS. 4 and 5, respectively.

Figure 3:
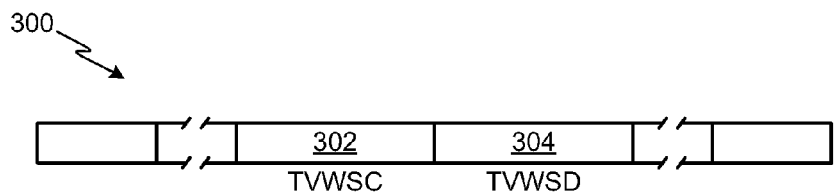
FIG. 3 depicts an example beacon frame that can be transmitted by the WLAN AP of FIGS. 1 and 2.

In some example implementations, to inform the wireless terminal 114 whether the WLAN AP 104 supports TVWS connectivity and whether the WLAN AP 104 is capable of communicating with the TVWS database 108, the WLAN AP 104 may transmit a TVWS advertisement indicating such capability information in a beacon signal 120. The format and structure of the beacon signal 120 is shown in FIG. 3. In some example implementations, the TVWS connectivity and capability of communicating with the TVWS database 108 can be transmitted in a probe response message (e.g., the AN response message 118). In the illustrated examples described herein, supporting TVWS connectivity indicates that an access point is capable of communicating with a TVBD using TVWS protocol and frequency requirements, and advertising a capability to communicate with (e.g., network reachability or connectivity) the TVWS database 108 indicates that the access point can route queries to the TVWS database 108 and receive responses from the TVWS database 108 (and route the responses to the requesting device).

In the illustrated example of FIG. 1, the WLAN AP 104 does not support TVWS connectivity, but it is capable of communicating with the TVWS database 108. Similar information indicating support for TVWS connectivity and communication with the TVWS database 108 may also be transmitted in beacon signals of TVWS access points (e.g., the TVWS access point 128c) to indicate support for TVWS connectivity with TVBDs and capabilities to communicate with the TVWS database 108. In this manner, the wireless terminal 114 can connect with a TVWS access network using a TVWS protocol and frequency to retrieve updated TVWS connectivity capability/requirements information for connecting to the TVWS access network and/or for retrieving TVWS connectivity capability/requirements information for connecting to a TVWS access network at another location.

In other example implementations, the beacon and probe responses can be transmitted using another radio access technology (RAT) such as a cellular system, if the TVBD is a multi-mode device also supporting this technology.

In the illustrated example of FIG. 1, TVWS connectivity information 122 stored in the TVWS database 108 is shown as having record entries for each of three different TVWS access networks 126a-c. The TVWS connectivity information 122 includes the capabilities and requirements for connecting to each of the TVWS access networks 126a-c. Such TVWS connectivity capabilities and requirements include, for example, frequencies, available bandwidth, power, policy, timing, location, and access rights to channels allocated for TVWS connections. In the illustrated example, the TVWS access network 126a is shown as located at location A, the TVWS access network 126b is shown as located at location B, and the TVWS access network 126c is shown as located at location C. To query the TVWS database 108 for TVWS connectivity information for a particular one of the locations A-C, the wireless terminal 114 can send a location identifier for the corresponding location (e.g., one of the locations A-C) to the TVWS database 108. In this manner, the TVWS database 108 can use the received location identifier to locate, in its records, the requested TVWS connectivity information for a corresponding one of the TVWS access networks 126a-c.

As shown in FIG. 1, an example operating scenario involves the wireless terminal 114 requesting connectivity information for the TVWS access network 126c at location C while in communication with the WLAN access network 102. In this manner, when the wireless terminal 114 is moved to location C, the wireless terminal 114 is aware of (e.g., has stored therein) all the TVWS connectivity capabilities and requirements of the TVWS access network 126c to facilitate association of the wireless terminal 114 with the TVWS access network 126c. The example methods and apparatus described herein may be employed in such a manner when, for example, a person travels between different regions or countries (e.g., the WLAN access network 102 and the TVWS access network 126c may be in different regions or countries). Alternatively, the wireless terminal 114 may access the TVWS database 108 to discover TVWS connectivity capabilities and requirements for a TVWS access network that is nearby and reachable from its current location (e.g., the WLAN access network 102 and one of the TVWS access networks 126a-c may be co-located in the same region or overlapping regions). Example processes that may be used to access the TVWS database 108 to, for example, retrieve TVWS connectivity capabilities and requirements, are described below in connection with FIG. 19.

In some instances, TVWS access networks may change their connectivity capabilities and requirements from time to time such that channels available for communication or useable transmission power levels may change. In such instances, the example methods and apparatus may also be used by a wireless terminal to retrieve updated TVWS information associated with a TVWS access network to which the wireless terminal is already connected. In such example implementations the wireless terminal may access the TVWS information via the TVWS access network or another access network (including another type of access network). Alternatively, this updated information may be broadcast to TVBDs, either in beacon (or broadcast) messages or unsolicited information element messages. Such broadcasting or pushing of updated TVWS connectivity information from the TVWS database 108 is described in detail below in connection with the flow diagram of FIG. 20.

In the illustrated example, each of the TVWS access networks 126a-c is represented by a television transmission tower. In such example implementations, each television transmission tower can be provided with a TVWS access point 128a-c connected to the external network 110 through, for example, a respective NAS (not shown). In this manner, the wireless terminal 114 can connect with the TVWS access networks 126a-c using a TVWS protocol and frequency.

In the illustrated example, the request message 116 and the response message 118 can be exchanged without needing the wireless terminal 114 to be in an associated state with (e.g., without registering with) the WLAN AP 104. Example advantages of keeping the wireless terminal 114 in a non-associated state relative to the WLAN AP 104 include preserving battery power and processing resources of the wireless terminal 114 and preserving processing and bandwidth resources of the WLAN AP 104 that would otherwise be needed to negotiate an association/registration session with the WLAN AP 104. A security mechanism may be applied to such non-associated database information exchange to maintain the integrity of the information. However, the example methods and apparatus described herein may also be implemented while the wireless terminal 114 is in an associated state relative to the WLAN AP 104.

FIG. 2 depicts an example communication exchange 200 between the wireless terminal 114, the WLAN AP 104, and the TVWS database 108 of FIG. 1 to access information in the TVWS database 108. Although not shown, some or all of the message exchanges shown in FIG. 2 as being performed by the WLAN AP 104 may be performed by a combination of the NAS 106 and the WLAN AP 104. In the illustrated example, the wireless terminal 114 sends the AN request message 116 to the WLAN AP 105. The AN request message 116 includes a database request 202 intended for delivery to the TVWS database 108. In some example implementations, the AN request message 116 may be sent by the wireless terminal 114 in response to user input requesting to access (e.g., retrieve, store, modify, etc.) information in the TVWS database 108, while in other example implementations, the AN request message 116 may be sent in response to a process of the wireless terminal 114. The database request 202 may be, for example, a request for TVWS connectivity capabilities and requirements for different TVWS access networks (e.g., the TVWS access networks 126*a-c*), a request for a database address, a request to register with the TVWS database 108 or any other request described below in connection with FIGS. 6-8.

After receiving the AN request message 116, the WLAN AP 104 parses out the database request 202 and forwards the database request 202 to the TVWS database 108. In response to the database request 202, the TVWS database 108 performs a requested operation and sends a database response 204 to the WLAN AP 104 that is intended for delivery to the wireless terminal 114. The WLAN AP 104 forms the AN response message 118 to forward the database response 204 therein to the wireless terminal 114. Example frames that may be used for exchanging communications and information with the TVWS database 108 using the database request 202 and the database response 204 are described below in connection with FIGS. 6-8, 10, and 11.

In the illustrated example of FIG. 2, the request and response messages 116 and 118 can be exchanged using a pre-defined query protocol such as Access Network Query Protocol (ANQP) that is transported using Generic Advertisement Service (GAS) query/response formatted frames. The GAS protocol, as defined in IEEE® 802.11, provides transport mechanisms for advertisement services between the WLAN APs and wireless terminals while the wireless terminals are in a non-associated state (or an associated state) with the wireless APs. As used in connection with the example methods and apparatus described herein, the ANQP enables STAs (e.g., the wireless terminal 114) to discover the availability of information (e.g., TVWS connectivity capabilities/requirements, etc.) related to desired network services. The communications described herein between the wireless terminal 114 and the WLAN AP 104 (or any other AP) to access the TVWS database 108 may be performed at layer 2 (e.g., a media access control (MAC) layer) of the Open Systems Interconnect (OSI) model.

Alternatively, the request and response messages 116 and 118 may be exchanged using information elements as defined in IEEE® 802.11.

In some example implementations, to protect the information in messages 116, 118, 202, and 204, keys can be used to perform message integrity check (MIC) operations on the messages 116, thus, securing messages 116 and 118 in OSI layer 2 exchanges. The keys may be derived using, for example, Diffie Hellman exchanges between the wireless terminal 114 and the TVWS database 108, together with a unique White Space identifier of the wireless terminal 114 (e.g. a Federal Communications Commission (FCC) ID and its serial number). Additionally or alternatively, other procedures may also be used to secure the information exchange with the TVWS database 108.

FIG. 3 depicts an example beacon frame 300 that can be transmitted in the beacon signal 120 (FIG. 1) by the WLAN AP 104 of FIG. 1. In the illustrated example, the example beacon frame 300 includes a TVWS capability (TVWSC) field 302 and a TVWS database reachability (TVWSD) field 304. The TVWSC field 302 stores information indicative of whether an access point (e.g., the WLAN AP 104 or TVWS APs of the TVWS ANs 126*a-c* of FIG. 1) has TVWS capabilities to enable connecting to a TVBD using a TVWS protocol and frequency. The TVWSD field 304 indicates whether an access point (e.g., the WLAN AP 104 or the TVWS APs 128*a-c* of FIG. 1) is capable of exchanging communications with the TVWS database 108. As such, the TVWSC field 302 and the TVWSD field 304 may be used in combination to indicate that a TVWS-capable AP lacks network reachability of a TVWS database (e.g., if the AP is in motion itself).

In the illustrated example of FIG. 3, each of the TVWSC field 302 and the TVWSD field 304 is a one-bit field. Also in the illustrated example, the TVWSC field 302 may be set (i.e., TVWSC field='1') to indicate support for connecting to a TVBD (e.g., the wireless terminal 114) or cleared (i.e., TVWSC field='0') to indicate non-support for connecting to a TVBD. Also in the illustrated example, the TVWSD field 302 may be set (i.e., TVWSD field='1') to indicate support for exchanging communications with the TVWS database 108 (and network reachability of the TVWS database 108) or cleared (i.e., TVWSD field='0') to indicate non-support for exchanging communications with the TVWS database 108 (or non-reachability of the TVWS database 108).

The wireless terminal 114 can use the information in the TVWSC field 302 to determine whether it can connect to a particular AP (e.g., one of the TVWS APs 128*a-c* of FIG. 1) using a TVWS communication interface. The wireless terminal 114 can use the information in the TVWSD field 304 to determine whether to send the AN request message 116 to an AP (e.g., the WLAN AP 104 or one of the TVWS APs 128*a-c* of FIG. 1) or whether such a communication would be unproductive (and wasteful of battery and processing power) because the AP lacks network reachability of the TVWS database 108.

Although the TVWSC and TVWSD fields 302 and 304 are shown in the beacon frame 300, which may be communicated via the beacon signal 120 (FIG. 1), the TVWSC and TVWSD fields 302 and 304 may alternatively be communicated by the WLAN AP 104 or the TVWS APs 128*a-c* in probe response messages (e.g., the AN response message 118 of FIGS. 1 and 2) to the wireless terminal 114. In such example implementations, probe response messages from APs may be used to advertise AP capabilities to wireless terminals and/or request capability information from wireless terminals.

FIG. 4 depicts the AN request message 116 of FIGS. 1 and 2 and the database request frame 202 of FIG. 2. In the illustrated example, the AN request message 116 includes an INFO ID field 402, a length field 404, and a TVWS protocol (TVWSP) frame field 406. In some example implementations, the AN request message 116 may be implemented using a GAS query/response format, and the fields 402, 404, and 406 may form an information element implemented in accordance with an access network query protocol (ANQP) defined in IEEE® 802.11. The ANQP supports information retrieval from an information repository on an AP (e.g., a copy of some or all of the contents of the TVWS database 108 stored in the WLAN AP 104 or the TVWS APs 128a-c) or an external network (e.g., the TVWS database 108 in the external network 110 of FIG. 1).

In the example implementations described herein, the wireless terminal 114 may use the ANQP information element to query the TVWS database 108 (or a copy of the TVWS database 108 stored locally in an AP or other entity in a local access network) and receive responses from the TVWS database 108 through the WLAN AP 104. That is, when the WLAN AP 104 receives the AN request message 116 from the wireless terminal 114, the WLAN AP 104 (or the NAS 106 of FIG. 1) can parse out information from the INFO ID field 402, the length field 404, and the TVWSP frame field 406, form the database request 202 based on the parsed out information, and send the database request 202 to the TVWSC database 108. In the illustrated example, to indicate that the wireless terminal 114 is communicating a query intended for the TVWS database 108, the wireless terminal 114 stores an identifier value in the INFO ID field 402 identifying the communication as containing a TVWSP frame. In addition, the length field 404 specifies the size of the information in the TVWSP frame field 406, and the TVWSP frame field 406 includes the query intended for the TVWS database 108. Example TVWSP frames that may be communicated in the TVWS frame field 406 are described below in connection with FIGS. 6-9.

FIG. 5 depicts the database response frame 204 of FIG. 2 and the AN response message 118 of FIGS. 1 and 2. In the illustrated example, the AN response message 118 includes an INFO ID field 502, a length field 504, and a TVWSP frame field 506. The AN response message 118 may be implemented using a GAS query/response format, and the fields 502, 504, and 506 may form an ANQP information element.

In the example implementations described herein, the WLAN AP 104 may use the ANQP information element to forward the database response 204 from the TVWS database 108 to the wireless terminal 114. That is, when the WLAN AP 104 receives the database response 204 from the TVWS database 108, the WLAN AP 104 (or the NAS 106 of FIG. 1) can provide information in the INFO ID field 502, the length field 504, and the TVWSP frame field 506 corresponding to the database response 204, form the AN response message 118, and send the AN response message 118 to the wireless terminal 114. In the illustrated example, the INFO ID field 502 identifies the communication as including a TVWSP frame, the length field 504 specifies the size of the TVWSP frame field 506, and the TVWSP frame field 506 includes the response from the information in the TVWS database 108. Example response frames that may be communicated in the TVWS frame field 506 are described below in connection with FIGS. 10 and 11.

Figure 6:
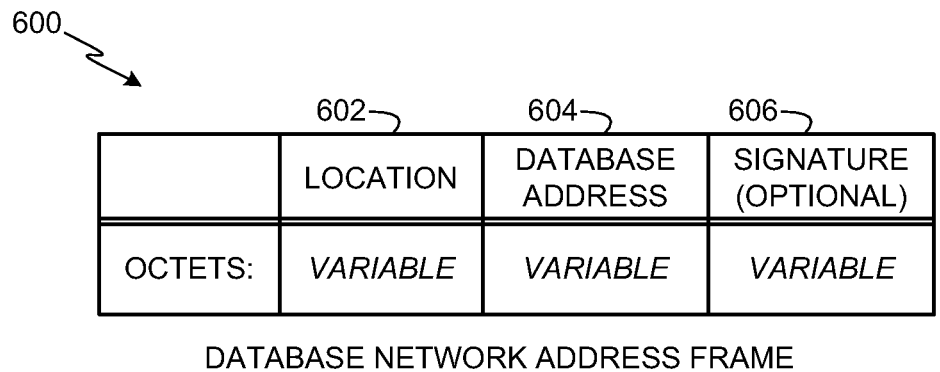
FIG. 6 depicts an example database network address frame that may be used in connection with the database query and response frames of FIGS. 2, 3, and 4 to retrieve a network address of the TVWS database of FIGS. 1 and 2.
Figure 7:
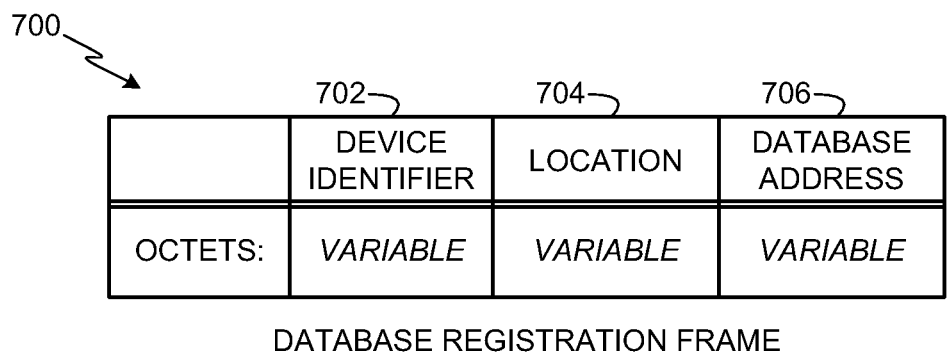
FIG. 7 depicts an example database registration frame that may be used in connection with the database query and response frames of FIGS. 2, 3, and 4 to register with TVWS database of FIGS. 1 and 2.
Figure 10:
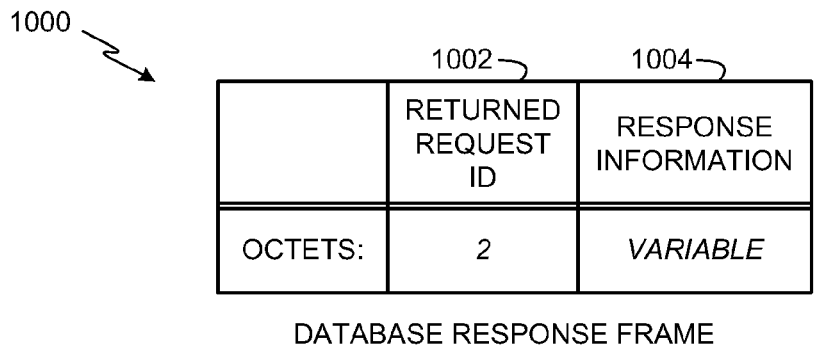
FIG. 10 depicts an example database response frame that may be used in connection with the database response of FIGS. 2 and 5 to communicate information from the TVWS database to the wireless terminal of FIGS. 1 and 2.
Figure 11:
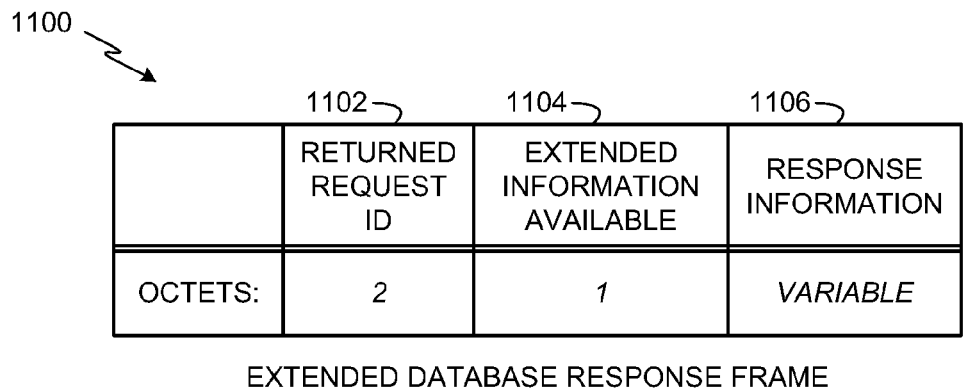
FIG. 11 depicts an extended database response frame that may be used in connection with the database response of FIGS. 2 and 5 to communicate extended information from the TVWS database to the wireless terminal of FIGS. 1 and 2.

FIGS. 6, 7, and 8 depict example TVWSP frames that the wireless terminal 108 can use to query the WLAN AP 104 and/or the TVWS database 108 regarding connectivity information associated with the TVWS access networks (e.g., the TVWS access networks 126a-c of FIG. 1), and FIGS. 6, 10, and 11 depict example TVWSP frames that can be used to send responses to the wireless terminal 114. FIG. 6 is a database network address frame 600 that can be used to query the WLAN AP 104 for network addresses of TVWS databases (e.g., the TVWS database 108) accessible by the WLAN AP 104. The example TVWSP frames of FIGS. 7 and 8 can be communicated by the wireless terminal 114 to the WLAN AP 104 in the TVWSP frame field 406 (FIG. 4) and from the WLAN AP 104 to the TVWS database 108 in the database request 202 (FIGS. 2 and 4). The example TVWSP frames of FIGS. 10 and 11 can be communicated by the TVWS database 108 to the WLAN AP 104 in the database response 204 (FIGS. 2 and 5) and from the WLAN AP 104 to the wireless terminal 114 in the TVWSP frame field 506 (FIG. 5). In some example implementations, not all of the TVWSP frame types of FIGS. 6, 7, 8, 10, and 11 may be required for the wireless terminal 114 to obtain information or make requests to the TVWS database 108. For example, if an AAA server is co-located with the TVWS database 108, the wireless terminal 114 may not need to discover the address of the TVWS database 108 and, thus, would not use the database network address frame 600.

Now turning to FIG. 6, the example database network address frame 600 may be used to retrieve a network address of the TVWS database 108 of FIGS. 1 and 2 (or any other TVWS databases accessible by the WLAN AP 104). In the illustrated example of FIG. 6, the database network address frame 600 includes a location field 602, a database address field 604, and an optional signature field 606. The location field 602 is a variable length field that contains the location for which the wireless terminal 114 is requesting to access TVWS information (e.g., TVWS connectivity capabilities and/or requirement information). The location could be a current location of the wireless terminal 114 or a location at which the wireless terminal 114 is expected to operate at some future time. Thus, the wireless terminal 114 could indicate any location (not just its current location) for which TVWS connectivity information is desired. In this manner, information from the TVWS database 108 could be retrieved via the Internet 112 from a user's home (e.g., through Ethernet, USB or over any wireless RAT on the wireless terminal 114) and then used for TVWS connectivity (e.g., via the TVWS access networks 126a-c of FIG. 1) in another location at some later time. The location information could be in the form of, for example, a hotspot ID, latitude/longitude global positioning system (GPS) coordinates, region identifiers (e.g., municipality names), civic address, etc. Omitting location information in the location field 602 indicates a current location as determined by the access network in communication with the wireless terminal 114.

The database address field 604 is a variable length field used to indicate a network address to which the WLAN AP 104 can send a database query (e.g., the database request 202 of FIGS. 2 and 4) related to a TVWS access network at a location indicated in the location field 602. That is, if the location field 602 indicates location C (FIG. 1), the database address field 604 provides the network address of the TVWS database 108, because the TVWS database 108 stores information about the TVWS access network 126c at location C.

In some example implementations, the database address field 604 could also be used as a search field. For example, the string "local" in the database address field 604 could be used to retrieve a network address of a local TVWS database, the string "all" in the database address field 604 could return a list of all relevant TVWS databases, and the string "free" in the database address field 604 could be used to retrieve network addresses for TVWS databases that are free to access. In addition, the database address field 604 could be used to implement a rich query mechanism to discover different types of TVWS databases meeting different types of criteria for different purposes and information, for example.

In a valid response (i.e., success) from the WLAN AP 104, the database address field 604 provides a network address of a TVWS database (e.g., the TVWS database 108) meeting the criteria (e.g., location and/or any other criteria) provided by the wireless terminal 114. For example, the network address of the TVWS database could be a uniform resource identifier (URI) (e.g., http://White_Space.regulator-fcc.org). In some example implementations, the network address of a local copy of a TVWS database could be returned (e.g., http://White_Spacesim.waterloo.org) and/or a list of alternative network addresses could be returned depending upon the information stored in those alternative TVWS databases. In some example implementations, a different uniform resource name (URN) could be used to address TVWS databases. Such a URN could be 'tvbd' rather than 'http' (e.g., tvbd://White_Space.regulator-fcc.org). The wireless terminal 114 can address further database requests to the provided network address to, for example, retrieve TVWS connectivity information (e.g., the TVWS connectivity information 122 of FIG. 1) from the TVWS database 108 or send any other types of requests to the TVWS database 108.

In some example implementations, the database network address frame 600 may also include information indicating whether TVWS databases require TVBDs to register therewith before allowing the TVBDs to access information stored in those TVWS databases. In some example implementations, TVBDs required to register with TVWS databases may be devices with fixed locations that supply a fixed set of GPS coordinates. The database network address frame 600 may also include information specifying the type of information parameters (e.g., authentication credentials, username/password, payment tokens, etc.) required to register wireless terminals with the TVWS databases.

In example implementations in which a TVWS database is located within a cellular core network (not shown) to which an AP (e.g., the WLAN AP 104, the TVWS APs 128*a-c* of FIG. 1, or a cellular access network AP) is connected, a network address of the TVWS database 108 may not be required. In such implementations, the TVWS database could be accessed directly using an IEEE® 802.11 3GPP Cellular Network Information frame (e.g., a generic container) shown in FIG. 13 and discussed in detail below. Also in such example implementations, the capabilities of the AP (connected to the cellular network) related to network reachability of the TVWS databases (e.g., as indicated in the TVWSD field 304 of FIG. 3) and the capabilities of the AP to connect with wireless terminals using a TVWS protocol and frequency (e.g., as indicated in the TVWSC field 302 of FIG. 3) may be communicated by the AP in accordance with the access network and discovery selection function (ANDSF) defined in 3GPP TS 24.312 and/or in accordance with IEEE® 802.21 information servers (IS).

In the illustrated example of FIG. 6, the signature field 606 is an optional field that can transmit a message integrity check (MIC) to provide message integrity with an AAA server (e.g., the AAA server 1402 of FIG. 14) for instances in which registration or authentication is required to communicate with the TVWS database 108. When such registration or authentication is required, a security parameter in the signature field 606 could be mandated by an AAA protocol (e.g., the RADIUS protocol or Diameter protocol) between the NAS 106 and the TVWS database 108.

FIG. 7 depicts an example database registration frame 700 that may be used by TVBDs (e.g., TVBDs with fixed locations) to register with TVWS database 108 of FIGS. 1 and 2. In the illustrated example, the database registration frame 700 includes a device identifier field 702, a location field 704, and a database address field 706. The device identifier field 702 is a variable field that stores an identification and/or credential, which may be mandated by an operator (e.g., an Internet/network service provider, a services provider, a database host, etc.) of the TVWS database 108. In the United States of America, such an identification and/or credential could be a certificate based on the Federal Communications Commission (FCC) ID of the device.

The location field 704 is similar to the location field 602 of FIG. 6, and the database address field 706 is used to communicate the network address received by the wireless terminal 114 in the database address field 604 of FIG. 6. In communicating the database registration frame 700, the wireless terminal 114 requests registration with the TVWS database 108 based on its device identifier and/or credential to perform queries or other requests to the TVWS database 108 (which is denoted by the network address in the database address field 706) related to a TVWS access network at the location specified in the location field 704. In some example implementations, other fields (e.g., authentication and/or registration information fields) could be added to the database registration frame 700, as required by the addressed TVWS database.

FIG. 8 depicts an example database request frame 800 that may be used in connection with the database request 202 of FIGS. 2 and 4 to send requests to the TVWS database 108. In the illustrated example, the database request frame 800 includes a request ID field 802, a request type field 804, a request command information field 806, a location field 808, a database address field 810, and a time field 812. In the illustrated example, the request ID field 802 is a fixed length field that stores values corresponding to unique numbers that uniquely identify each request. These request IDs are used to identify corresponding responses from the TVWS database 108.

The request type field 804 is a fixed length field that stores a request type value indicative of the type of request being made in each database request. Example request types are shown in an example request type values data structure 900 of FIG. 9. The request command information field 806 is used to store a query, request, or other information sent to the TVWS database 108. The information that may be stored in the request type field 804 and the request command information field 806 is described in greater detail below in connection with FIG. 9.

The location field 808 is similar to the location fields 602 (FIG. 6) and 704 (FIG. 7), and the database address field 810 is similar to the database address field 706 of FIG. 7.

In the illustrated example, the time field 812 is a variable length field that may be used by the wireless terminal 114 to request information from the TVWS database 108 at a future time (e.g., there may be a prescheduled TV primary service, which would occupy some of the TVWS bands, so that these TVWS bands would no longer be available at the requested location at that future time).

In some example implementations, the database registration frame 700 and the database request frame 800 may be combined so that a TVBD can register and receive a channel assignment in the same response (e.g., the database response 204 of FIGS. 2 and 5). In such implementations, the database request would be generated with a corresponding request type identifier (e.g., a database registration and channel request type '7' shown in FIG. 9) in the request type field 804.

Turning to FIG. 9, the example request type values data structure 900 includes different request types that can be indicated in the request type field 804 of the database request frame 800 of FIG. 8 to indicate different types of requests communicated to the TVWS database 108. In the illustrated example of FIG. 9, a request type of '1' indicates a database query request for which the request command information field 806 of FIG. 8 contains a query for information from the TVWS database 108. The request command information field 806 allows the wireless terminal 114 to send any type of query protocol (e.g., http GET, SQL, etc.) to the TVWS database 108. For example, a query could be of many different types, depending on the amount and detail of information sought to be retrieved. Example queries include: (a) requesting all information (e.g., a mirror of the TVWS database 108); (b) requesting all information for a particular location (e.g., for the location indicated in the location field 808); (c) requesting information updates in a particular location (e.g., updates to network connectivity information that occurred since a particular time); and/or (d) requesting a listing of available TVWS channels for a particular location (and the radius of usage for each channel).

A request type of '2' indicates a database update request for which the request command information field 806 of FIG. 8 contains a request for an update from the TVWS database 108 that could, for example, include an identifier of a specific update to TVWS network connectivity information. To make such an update request, any type of query protocol (e.g., http GET, SQL, etc.) could be used. Example update requests include: (a) a request to retrieve a most recent update; (b) a request to retrieve a specific update (e.g., using an update identifier); (c) a request to retrieve all updates having occurred during the previous 24 hours (or other time period); and (d) a request to retrieve all updates for a particular location having occurred during the previous 24 hours (or other time period).

A request type of '3' indicates a database upload request for which the request command information field 806 contains a request to upload information to the TVWS database 108 and also contains the information to be uploaded. The upload request could be provided in the request command information field 806 using any type of query protocol (e.g. http GET, SQL, etc.). In some example implementations, the wireless terminal 114 may provide the upload information in a free format. Alternatively or additionally, the upload information could be provided in accordance with required database parameters, which could be retrieved from the TVWS database 108 (e.g., using a request type of '4' described below). To upload extra information from the device to the TVWS database 108, multiple database upload requests may be transmitted in seriatim as many times as required.

A request type of '4' indicates a database access parameters request for which the request command information field 806 contains a request to determine the type of database access parameters that may be required by the TVWS database 108 to upload information. Such database access parameters may indicate the requirement of a username to allow access, or the parameters could be more complex such as a set of parameters (e.g., power level, authentication credentials, payment tokens, etc.).

In some example implementations, wireless terminals may be required to provide their location and power level to the TVWS database 108, prior to operation on a particular RAT. In some example implementations, such data access parameters would have to be transmitted through another RAT-b (e.g., an IEEE® 802.11 RAT) of a wireless terminal, prior to RAT-a (e.g., a TVWS RAT) operation of that wireless terminal.

For the database access parameters request (e.g., a request type of '4'), the request command information field 806 may be left blank. A response information field of a database response frame (e.g., the database response frames of FIGS. 10 and 11) would contain a list of parameter IDs, to indicate which parameters are required.

A request type of '5' indicates a database modification request for which the request command information field 806 contains a request to modify (e.g., add, change, or delete) information in the TVWS database 108. For this request type, the request command information field 806 may contain any type of query protocol (e.g. http GET, SQL, etc.) for sending to the TVWS database 108 to perform the requested modification. In some example implementations, the database modification request (e.g., the request type of '5') can be used as an operation and maintenance type of command. In addition, the database modification request may be restricted to certain users. In some example implementations, the database modification request could alternatively be implemented using the database upload request (e.g., a request type of '3')

A request type of '6' indicates a database validation request for which the request command information field 806 contains a request to the TVWS database 108 to confirm whether previously retrieved information stored in the wireless terminal 114 (or at a data store local to, for example, the WLAN AP 104) is still valid. For example, the wireless terminal 114 may periodically request such validations to ensure that the information it is using to connect to a TVWS access network is still valid and/or optimal. In addition, data stores local to WLAN APs or TVWS APs may store local copies of some or all of the database information from the TVWS database 108 to facilitate responding relatively quicker and more efficiently to queries from wireless terminals (e.g., the wireless terminal 114). In such instances, the local data stores can use database validation requests to determine when information stored therein is invalid relative to information in the TVWS database 108.

To perform the database validation request, the request command information field 806 allows any type of query protocol (e.g., http GET, SQL, etc.) to be sent to the TVWS database 108 to perform the validation. An example manner of performing a database validation request involves identifying the information desired to be validated and the time at which the information was retrieved from the TVWS database 108.

A request type of '7' indicates a database registration and channel request for which the request command information field 806 contains a request to register with the TVWS database 108 and receive a channel assignment from the TVWS database 108 in the same response from the TVWS database 108 that also confirms the registration therewith.

A request type of '8' indicates a security parameter request for indicating a security key exchange for which the request command information field 806 contains key information (e.g., a Diffie-Hellman key information) for developing security parameters between the wireless terminal 114 and the TVWS database 108.

FIG. 10 depicts an example database response frame 1000 that may be used to communicate information from the TVWS database 108 to the wireless terminal 114 of FIGS. 1 and 2. In the illustrated example, the database response frame 1000 includes a returned request ID field 1002 and a response information field 1004. The returned request ID field 1002 is a fixed field to store values that uniquely identify a corresponding original request (e.g., a request sent using the database request frame 800 of FIG. 8). For example, the values stored in the returned request ID field 1002 by the TVWS database 108 correspond to request IDs stored in the request ID field 802 of the database request frame 800. In addition, the returned request ID field 1002 enables the wireless terminal 114 to detect duplicate (and/or dropped) responses. In some example implementations, to provide assurances that data in the received responses correspond to previously sent requests, the original request ID (stored in the request ID field 802 of FIG. 8) may be hashed with a unique database identifier. When using hash techniques, the returned request ID may be longer (e.g., 2-times or 4-times longer).

The response information field 1004 is a variable length field that contains the response information from the TVWS database 108 in response to a corresponding original database request.

FIG. 11 depicts an extended database response frame 1100 that may additionally or alternatively be used to communicate information from the TVWS database 108 to the wireless terminal 114 of FIGS. 1 and 2. The extended database response frame 1100 may be used in example instances in which extended information fields can be used to facilitate transmitting more information from the TVWS database 108 to the wireless terminal 114 and/or the WLAN AP 104. In addition, the extended information fields may be used to keep the frames of FIGS. 6, 7, and 8 to a reasonable length by including the extended information fields only in the responses.

Although not shown, other extended information fields could include a time stamp field and an error/warning/info code field to enable the wireless terminal 114 and/or the WLAN AP 104 to assess the current validity of information and/or a state of the TVWS database 108.

Figure 12:
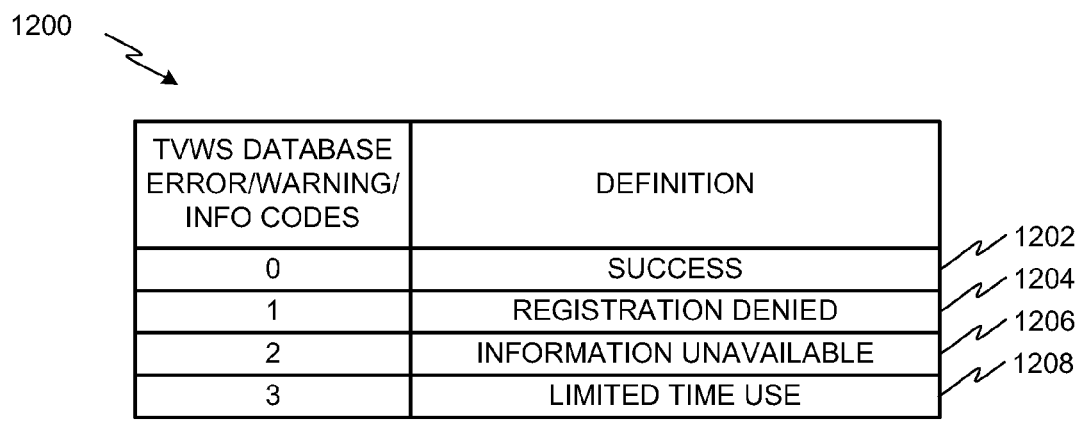
FIG. 12 depicts an example TVWS protocol (TVWSP) error/warning/info codes data structure including codes to inform the wireless terminal of FIGS. 1 and 2 of error, warning, and/or other operating states of the TVWS database of FIGS. 1 and 2.

FIG. 12 depicts an example TVWS protocol (TVWSP) error/warning/info codes data structure 1200 including codes to inform the wireless terminal 114 (FIGS. 1 and 2) of error, warning, and/or other operating states of the TVWS database 108 (FIGS. 1 and 2). The codes shown in FIG. 12 could be sent by the TVWS database 108 using the database response frame 1000 of FIG. 10 and/or the extended database response frame 1100 of FIG. 11. In the illustrated example of FIG. 12, the codes include a success code 1202 of '0', a registration denied code 1204 of '1', an information unavailable code 1206 of '2', and a limited time use code 1208 of '3'. The success code 1202 indicates that the requested operation was successfully completed. The registration denied code 1204 indicates that the TVWS database 108 denied registration to a wireless terminal (e.g., the wireless terminal 114). The information unavailable code 1206 indicates that queried information is unavailable in the TVWS database 108. The limited time use code 1208 indicates that the TVWS database 108 has registered a wireless terminal for a limited duration.

Figure 13:
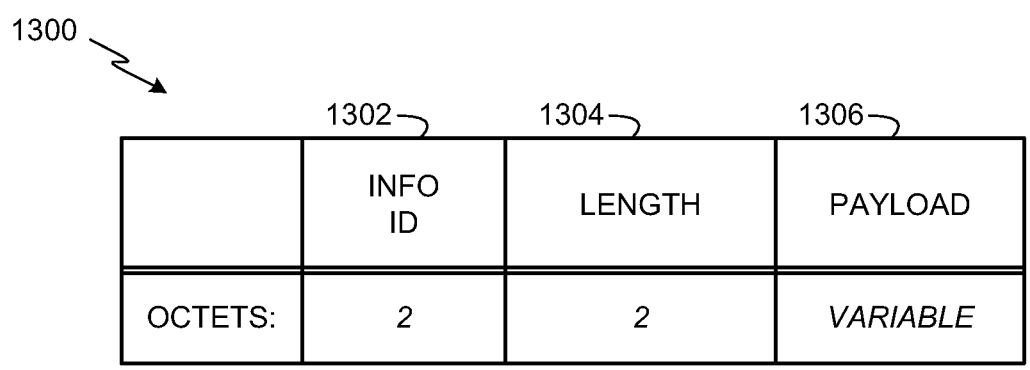
FIG. 13 depicts an example cellular network information frame for exchanging information with a TVWS database in a cellular network.

FIG. 13 depicts an example cellular network information frame 1300 for exchanging information with a TVWS database in a cellular network. In the illustrated example, the cellular network information frame 1300 is an IEEE® 802.11u 3GPP Cellular Network Information frame that provides a generic container (e.g., a payload) for use by an AP to exchange communications with a TVWS database located in a cellular network. In the illustrated example, the cellular network information frame 1300 includes an INFO ID field 1302, a length field 1304, and a payload field 1306. The INFO ID field 1302 can store a code identifying the communication as a TVWS database query. The length field 1304 is used to indicate the size of the variable-length payload field 1306. The payload field 1306 is used to encapsulate any of the TVWSP frames of FIGS. 6-8, 10, and 11 (or any other TVWSP frames) for exchanging information between an AP and the TVWS database in the cellular network.

FIG. 14 depicts another example communication network 1400 in connection with an authentication, authorization, and accounting (AAA) server 1402 co-located with the TVWS database 108 in the external network 110. In the illustrated example of FIG. 14, wireless terminals are required to be authenticated and authorized by the AAA server 1402 to access the TVWS database 108. Example authentication methods that may be employed by the AAA server 1402 include extensible authentication protocol (EAP) type authentication methods. The AAA server 1402 may be implemented using a Remote Authentication Dial In User Services (RADIUS) server or a Diameter server.

In the illustrated example of FIG. 14, the AAA server 1402 uses an AAA protocol to enable exchanging TVWSP frames between the TVWS database 108 and the NAS 106. This enables communicating requests and responses between the wireless terminal 114 and the TVWS database 108 based on an authentication policy. In example implementations in which the AAA server 1402 is implemented using a RADIUS server, the NAS 106 may use an example RADIUS time-length-value (TLV) structure 1500 of FIG. 15 to exchange information with the AAA server 1402. In example implementations in which the AAA server 1402 is implemented using a Diameter server, the NAS 106 may use an example Diameter attribute-value-pair (AVP) structure 1600 of FIG. 16 to exchange information with the AAA server 1402.

Figure 15:
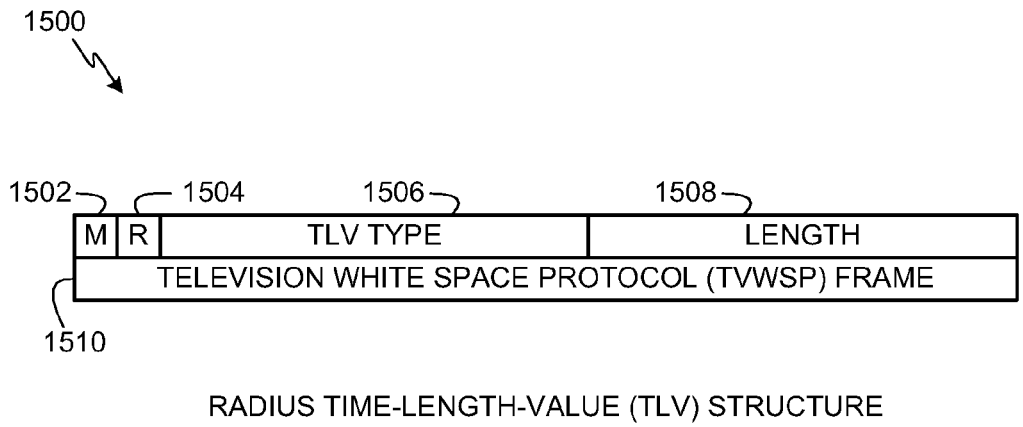
FIG. 15 depicts an example RADIUS time-length-value (TLV) structure that may be used to communicate a TVWSP frame from a network access server to a RADIUS server.

Turning to FIG. 15, the example RADIUS TLV structure 1500 includes a mandatory ('M') flag 1502, a reserved ('R') flag 1504, a TLV type field 1506, a length field 1508, and a TVWSP frame field 1510. The 'M' flag 1502 is used to indicate whether use of the RADIUS TLV structure 1500 is required (e.g., 'M'=1) to be communicated to the TVWS database 108 from the AAA server 1402 or whether it is optional (e.g., 'M'=0) such that the AAA server 1402 may forward only a TVWSP frame (e.g., one of the TVWSP frames of FIGS. 6-8) extracted from the RADIUS TLV structure 1500 to the TVWSP database 108. In the illustrated example, the 'R' flag 1504 is set to zero (0). The TLV type field 1506 is used to indicate the type of TLV information that is being sent. An example TLV type for the TVWSP frames described herein could be indicated as a 'TVWS_DP' type to indicate that the information element in the TVWSP frame field 1510 is a TVWSP frame. The length field 1508 is used to indicate the size of the information element in the TVWSP frame field 1510. The TVWSP frame field 1510 is used to encapsulate a TVWSP frame (e.g., the TVWSP frames of FIGS. 6-8, 10, and 11) in the RADIUS TLV structure 1500.

Figure 16:
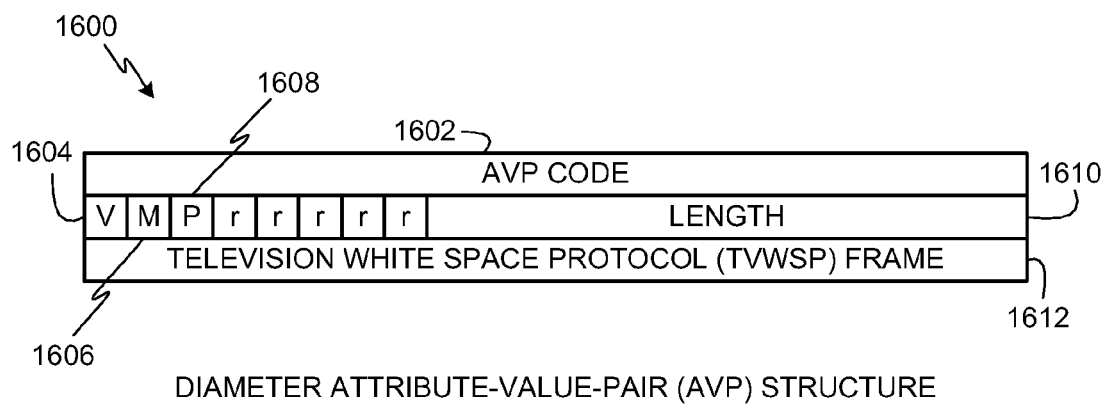
FIG. 16 depicts an example Diameter attribute-value-pair (AVP) structure that may be used to communicate a TVWSP frame from a network access server to a Diameter server.

Turning to FIG. 16, the example Diameter AVP structure 1600 includes an AVP code field 1602, a vendor ('V') flag 1604, a mandatory ('M') flag 1606, an encryption ('P') flag 1608, an AVP length field 1610, and a TVWSP frame field 1612. The AVP code field 1602 is used to indicate the type of AVP information that is being sent. An example AVP code for the TVWSP frames described herein could be indicated by an AVP code indicating that the information element in the TVWSP frame field 1612 is a TVWSP frame. The 'V' flag 1604 is used to indicate whether the AVP information being sent is vendor specific. The 'M' flag 1606 is used to indicate whether use of the Diameter AVP structure 1600 is required (e.g., 'M'=1) to be communicated to the TVWS database 108 from the AAA server 1402 or whether it is optional (e.g., 'M'=0) such that the AAA server 1402 may forward only a TVWSP frame (e.g., one of the TVWSP frames of FIGS. 6-8) extracted from the Diameter AVP structure 1600 to the TVWSP database 108. The 'P' flag 1608 is used to indicate whether end-to-end encryption is required (e.g., 'P'=1) or optional (e.g., 'P'=0). The AVP length field 1610 is used to indicate the size of the information element in the TVWSP frame field 1612. The TVWSP frame field 1612 is used to encapsulate a TVWSP frame (e.g., the TVWSP frames of FIGS. 6-8, 10, and 11) in the Diameter AVP structure 1600.

Figure 17:
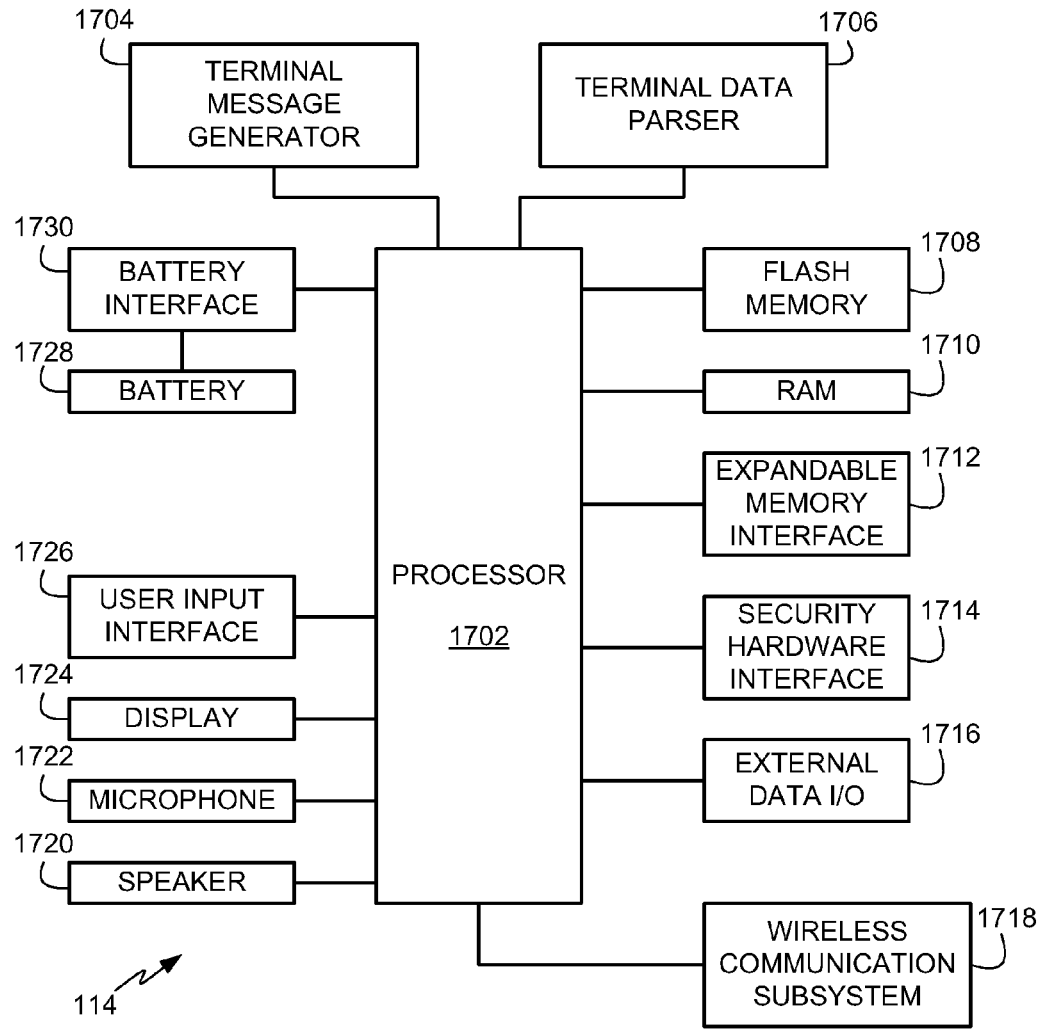
FIG. 17 depicts a detailed diagram of the example wireless terminal of FIGS. 1 and 2 that may be used to implement the example methods and apparatus described herein.

Referring now to FIG. 17, an example implementation of the wireless terminal 114 of FIGS. 1 and 2 is shown in block diagram form. In the illustrated example, the wireless terminal 114 includes a processor 1702 that may be used to control the overall operation of the wireless terminal 114. The processor 1702 may be implemented using a controller, a general purpose processor, a digital signal processor, or any combination thereof.

The wireless terminal 114 also includes a terminal message generator 1704 and a terminal data parser 1706. The terminal message generator 1704 may be used to generate queries and/or requests (e.g., the AN request message 116 of FIGS. 1 and 2) in accordance with request/query protocols and frame structures described herein. The terminal data parser 1706 may be used to retrieve frames of information from memory (e.g., a RAM 1710) and retrieve particular information of interest from those frames. For example, the terminal data parser 1706 may be used to retrieve information communicated in the AN response message 118 of FIGS. 1 and 2. Although the terminal message generator 1704 and the terminal data parser 1706 are shown as separate from and connected to the processor 1702, in some example implementations, the terminal message generator 1704 and the terminal data parser 1706 may be implemented in the processor 1702 and/or in a wireless communication subsystem (e.g., a wireless communication subsystem 1718). The terminal message generator 1704 and the terminal data parser 1706 may be implemented using any desired combination of hardware, firmware, and/or software. For example, one or more integrated circuits, discrete semiconductor components, and/or passive electronic components may be used. Thus, for example, the terminal message generator 1704 and the terminal data parser 1706, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 1704 and the terminal data parser 1706, or parts thereof, may be implemented using instructions, code, and/or other software and/or firmware, etc. stored on a machine accessible medium and executable by, for example, a processor (e.g., the example processor 1702). When any of the appended claims are read to cover a purely software implementation, at least one of the terminal message generator 1704 and the terminal data parser 1706 is hereby expressly defined to include a tangible medium such as a solid state memory, a magnetic memory, a DVD, a CD, etc.

The wireless terminal 114 also includes a FLASH memory 1708, a random access memory (RAM) 1710, and an expandable memory interface 1712 communicatively coupled to the processor 1702. The FLASH memory 1708 can be used to, for example, store computer readable instructions and/or data. In some example implementations, the FLASH memory 1708 can be used to store one or more of the type of information and/or data structures discussed above in connection with FIGS. 6-13, 15, and 16. The RAM 1710 can also be used to, for example, store data and/or instructions.

The wireless terminal 114 is optionally provided with a security hardware interface 1714 to receive a subscriber identity module (SIM) card (or a universal SIM (USIM) card or a near field communication (NFC) secure element) from a wireless service provider. A SIM card may be used as an authentication parameter to authenticate the wireless terminal 114 for establishing a connection with a database (e.g., the TVWS database 108 of FIG. 1), an access network (e.g., the WLAN access network 104 and/or the TVWS access networks 126a-c of FIG. 1), and/or an external network (e.g., the external network 110 of FIG. 1). The wireless terminal 114 is also provided with an external data I/O interface 1716. The external data I/O interface 1716 may be used by a user to transfer information to the wireless terminal 114 through a wired medium (e.g., Ethernet, universal serial bus (USB), etc.). A wired data transfer path may, for example, be used to communicate with the TVWS database 108.

The wireless terminal 114 is provided with a wireless communication subsystem 1718 to enable wireless communications with APs (e.g., the WLAN AP 104 and/or the TVWS APs 128a-c of FIG. 1). Although not shown, the wireless terminal 114 may also have a long-range communication subsystem to receive messages from, and send messages to, a cellular wireless network. In the illustrated examples described herein, the wireless communication subsystem 1718 can be configured in accordance with the IEEE® 802.11 standard and/or a TVWS standard for communicating with TVWS access networks (e.g., the TVWS access networks 126a-c). In other example implementations, the wireless communication subsystem 1718 can be implemented using a BLUETOOTH® radio, a ZIGBEE® device, a wireless USB device, a radio frequency identification (RFID) device, an NFC device, or an ultra-wideband (UWB) radio. In some example implementations, the wireless communication subsystem 1718 may be provided with multiple radio transceivers for multiple types of radio access technologies.

To enable a user to use and interact with or via the wireless terminal 114, the wireless terminal 114 is provided with a speaker 1720, a microphone 1722, a display 1724, and a user input interface 1726. The display 1724 can be an LCD display, an e-paper display, etc. The user input interface 1726 could be an alphanumeric keyboard and/or telephone-type keypad, a multi-direction actuator or roller wheel with dynamic button pressing capability, a touch panel, etc. In the illustrated example, the wireless terminal 114 is a battery-powered device and is, thus, provided with a battery 1728 and a battery interface 1730.

Figure 18:
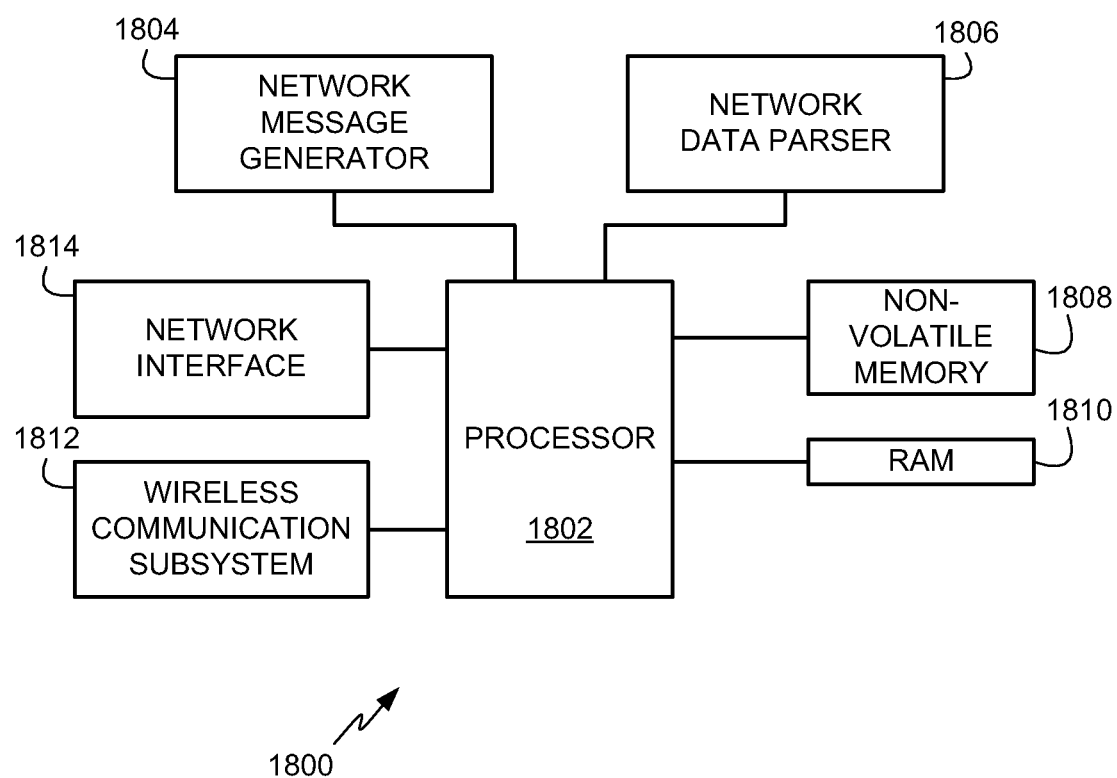
FIG. 18 depicts an example processor system for use in a network and that may be used to implement the example methods and apparatus described herein.

Turning now to FIG. 18, an example processor system 1800 for use in a network (e.g., the network 100 of FIG. 1 and/or the network 1400 of FIG. 14) is shown in block diagram form. Processor systems similar or identical to the processor system 1800 may be used to implement the WLAN AP 104, the NAS 106, the TVWS APs 128a-c of FIG. 1, and/or the AAA server 1402 of FIG. 14. The processor system 1800 includes a processor 1802 to perform the overall operations of the processor system 1800. In addition, the processor system 1800 includes a network message generator 1804 to generate messages (e.g., the database request 202 of FIGS. 2 and 4 and the AN response message 118 of FIGS. 1, 2, and 5) and a network data parser 1806 to retrieve information from received messages (e.g., the AN request message 116 of FIGS. 1, 2, and 4 and the database response 204 of FIGS. 2 and 5). The network message generator 1804 and the network data parser 1806 may be implemented in the processor 1802 and/or a communication subsystem (e.g., a wireless communication subsystem 1812 and/or a network interface 1814) using any combination of hardware, firmware, and/or software including instructions stored on a computer-readable medium.

The processor system 1800 also includes a FLASH memory 1808 and a RAM 1810, both of which are coupled to the processor 1802. The FLASH memory 1808 may be configured to store one or more of the type of information and/or data structures discussed above in connection with FIGS. 6-13, 15, and 16.

In some example implementations (e.g., in the WLAN AP 104 and the TVWS APs 128*a-c* of FIG. 1), to communicate with wireless terminals such as the wireless terminal 114, the processor system 1800 is provided with a wireless communication subsystem 1812, which may be substantially similar or identical to the wireless communication subsystem 1718 (FIG. 17) of the wireless terminal 114. To exchange communications with the TVWS database 108 (and/or any intermediate network entities such as the NAS 106 of FIGS. 1 and 14 and the AAA server 1402 of FIG. 14), the processor system 1800 is provided with a network interface 1814.

Figure 19:
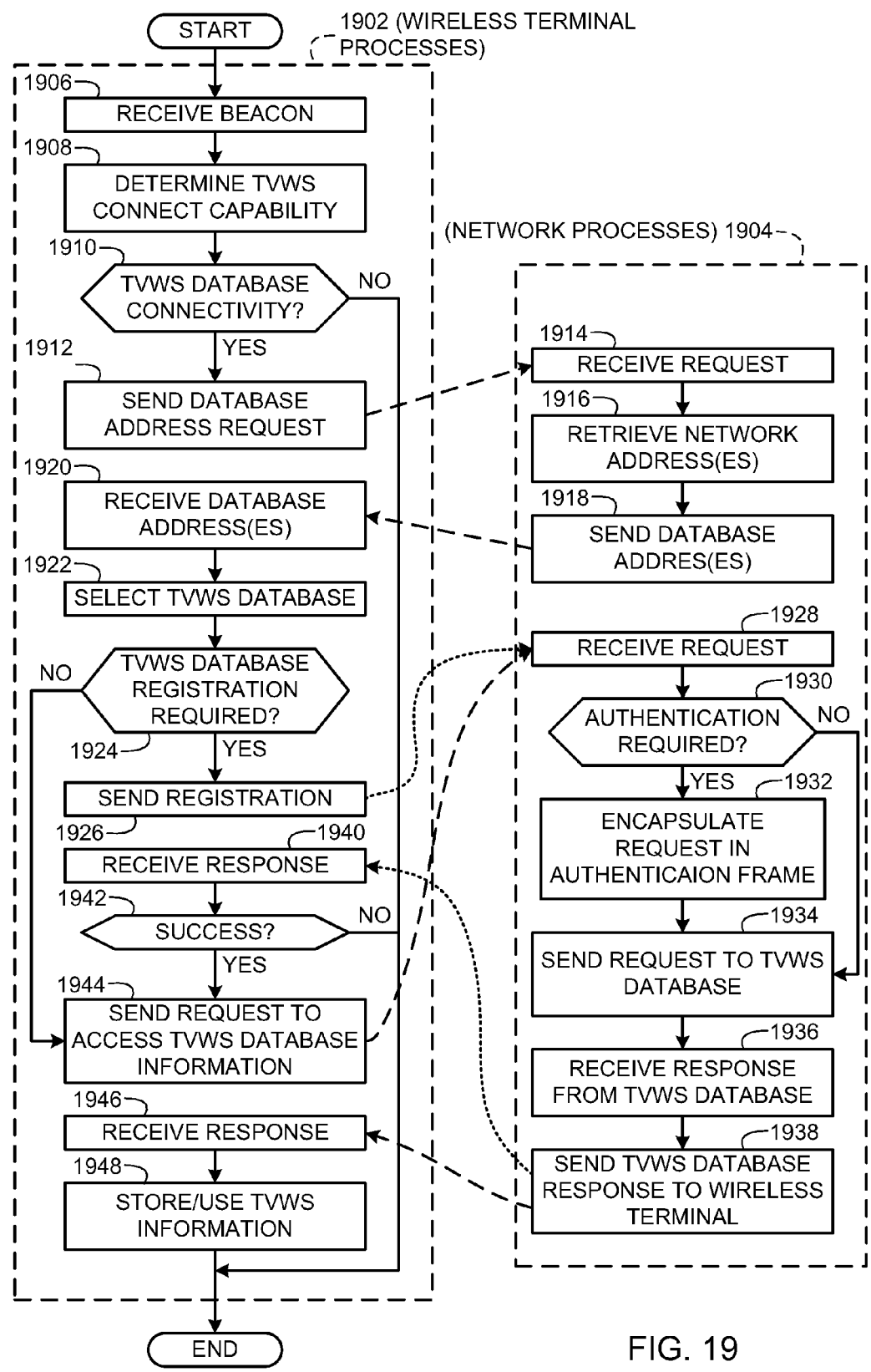
FIG. 19 depicts an example flow diagram representative of computer readable instructions that may be used to access a TVWS database using the example methods and apparatus described herein.
Figure 20:
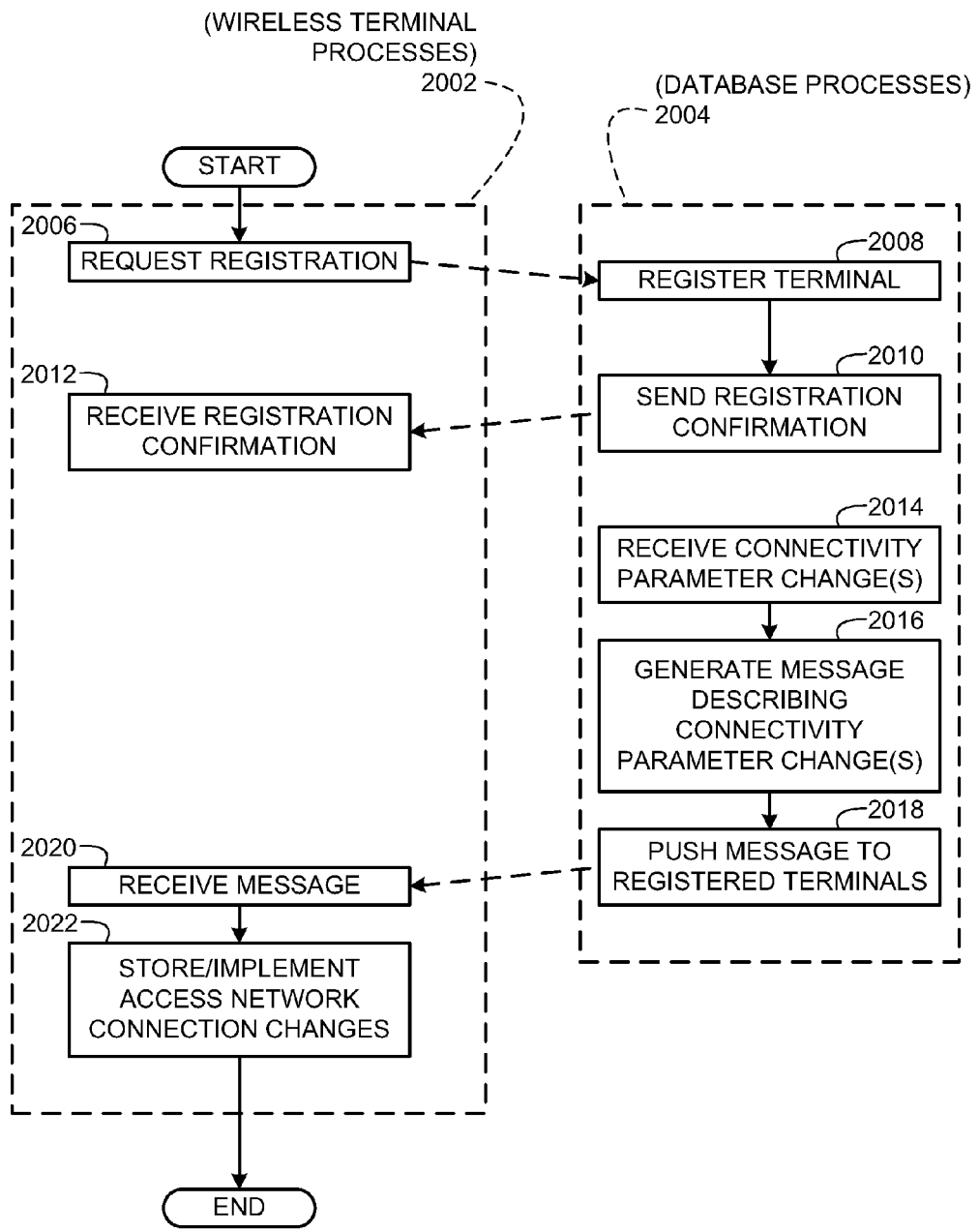
FIG. 20 depicts an example flow diagram representative of computer readable instructions that may be used to push TVWS connectivity information updates from a TVWS database to a registered terminal.

FIGS. 19 and 20 depict example flow diagrams representative of processes that may be implemented using, for example, computer readable instructions that may be used to obtain TVWS connectivity information from a database (e.g., the TVWS database 108 of FIGS. 1 and 2) indicative of capabilities and requirements for connecting to a TVWS access network (e.g., one of the TVWS access networks 126*a-c* of FIG. 1). The example processes of FIGS. 19 and 20 may be performed using one or more processors, controllers, and/or any other suitable processing devices. For example, the example processes of FIGS. 19 and 20 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 19 and 20 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 19 and 20 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 19 and 20 may be implemented manually or as any combination(s) of any of the foregoing techniques, for example, any combination of firmware, software, discrete logic and/or hardware. Further, although the example processes of FIGS. 19 and 20 are described with reference to the flow diagrams of FIGS. 19 and 20, other methods of implementing the processes of FIGS. 19 and 20 may be employed. For example, the order of execution of the blocks may be changed, and/or some of the blocks described may be changed, eliminated, subdivided, or combined. Additionally, any or all of the example processes of FIGS. 19 and 20 may be performed sequentially and/or in parallel by, for example, separate processing threads, processors, devices, discrete logic, circuits, etc.

Now turning to FIG. 19, example processes 1902 depict operations that may be performed by a wireless terminal (e.g., the wireless terminal 114 of FIGS. 1 and 2) or any other TVBD to exchange requests and responses with an access network access point (e.g., the WLAN AP 104 and/or the TVWS APs 128*a-c* of FIG. 1) and a database (e.g., the TVWS database 108 of FIG. 1). Example processes 1904 depict operations that may be performed by an access network (e.g., the WLAN AP 104 and/or the NAS 106 of the WLAN access network 102 of FIG. 1 or the TVWS APs 128*a-c* of FIG. 1). In some example implementations, the processes of FIG. 19 may be used to provide the wireless terminal 114 new and/or updated TVWS connectivity information indicative of capabilities and requirements for connecting to a TVWS access network (e.g., the TVWS access networks 126*a-c* of FIG. 1). In other example implementations, the processes of FIG. 19 may be used to perform any other TVWS database related operations requested by the wireless terminal 114 as discussed above in connection with the TVWSP frames of FIGS. 6-8 and the request type values data structure of FIG. 9. In addition, the processes of FIG. 19 may be performed while the wireless terminal 114 is in a non-associated state (or associated state) relative to an AP with which the wireless terminal 114 is communicating to access the TVWS database 108.

Initially, the wireless terminal 114 receives a beacon signal (e.g., the beacon signal 120 of FIG. 1) (block 1906). Alternatively, the wireless terminal 114 may receive a probe response message (e.g., the AN response message 118 of FIGS. 1, 2, and 5) from an AP at block 1906, in response to a probe request message 116 from the wireless terminal 114. The wireless terminal 114 determines the TVWS connect capability of the AP that broadcast the beacon signal (block 1908). For example, if the beacon signal 120 (or probe response) was transmitted by the WLAN AP 104 of FIG. 1, the beacon signal 120 (or probe response) would indicate in the TVWSC field 302 (FIG. 3) that the WLAN AP 104 is not capable of connecting with wireless terminals using a TVWS protocol and frequency. If, instead, the wireless terminal 114 received a beacon signal (or probe response) from one of the TVWS access networks 126*a-c*, the beacon signal (or probe response) would indicate in the TVWSC field 302 that the TVWS access network is capable of connecting with wireless terminals using a TVWS protocol and frequency. If the AP (e.g., one of the TVWS APs 128*a-c* of FIG. 1) is capable of connecting with the wireless terminal 114 using a TVWS protocol and frequency, further communications with the AP are performed via a TVWS connection. Otherwise, further communications with the AP are performed using a communication protocol compatible with the AP such as, for example, an IEEE® 802.11 protocol, a cellular protocol, a WiMAX protocol, etc.

The wireless terminal 114 determines whether the AP that broadcast the beacon signal is capable of connecting with a TVWS database (e.g., the TVWS database 108) (block 1910). Alternatively, the wireless terminal 114 may receive a probe response message (e.g., the AN response message 118) from an AP at block 1906, in response to a probe request message (e.g., the AN request message 116 of FIGS. 1, 2, and 4) from the wireless terminal 114. For example, the wireless terminal 114 may retrieve information from the TVWSD field 304 of FIG. 3 to determine whether the TVWS database 108 is reachable by the AP that broadcast the beacon signal (or probe response messages).

When the wireless terminal 114 determines that the TVWS database 108 is reachable by the AP that broadcast the beacon signal (block 1910) (or the sent the probe response message), the wireless terminal 114 sends a database address request (block 1912) to the AP. The database address request may be formatted and sent using the AN request message 116 and the database request 202 of FIGS. 1, 2, and 4 based on the database network address frame 600 of FIG. 6 as discussed above in connection with FIGS. 1, 2, 4, and 6.

The AP receives the database address request (block 1914) and retrieves one or more network address(es) for one or more reachable TVWS databases based on the information in the database address request (block 1916). The AP sends the database address(es) to the wireless terminal 114 (block 1918). If the AP cannot locate any database addresses matching the criteria in the database address request, the AP can instead send an error/warning/info code (e.g., the information unavailable code 1206 of FIG. 12) to the wireless terminal 114 at block 1918.

The wireless terminal 114 receives the database address (es) (block 1920) from the AP. The wireless terminal 114 can select a TVWS database (e.g., the TVWS database 108) with which to communicate (block 1922) and determines whether the selected TVWS database 108 requires the wireless terminal 114 to register therewith (block 1924). If the TVWS database 108 requires wireless terminal registration (block 1924), the wireless terminal 114 sends a registration request to the AP (block 1926). In the illustrated example, the wireless terminal 114 can format and send the registration request using the AN request message 116 of FIGS. 1, 2, and 4 based on the database registration frame 700 of FIG. 7 as discussed above in connection with FIGS. 1, 2, 4, and 7.

In the illustrated example of FIG. 19, the AP may perform the operations of blocks 1928, 1930, 1932, 1934, 1936, and 1938 described below to process requests/queries (e.g., the AN request message 116 and the database request 202 of FIGS. 1, 2, and 4) sent by the wireless terminal 114 for delivery to a TVWS database (e.g., the TVWS database 108).

The AP receives the registration request from the wireless terminal 114 (block 1928). For example, the AP may receive the registration request from the wireless terminal in the AN request 116 (FIGS. 1, 2, and 4) formatted in accordance with the database registration frame 700 (FIG. 7). If the AP determines that the TVWS database 108 requires authentication (block 1930), the AP (or NAS 106 of FIGS. 1 and 14) encapsulates the registration request in an authentication frame (e.g., one of the RADIUS TLV structure 1500 of FIG. 15 or the Diameter AVP structure 1600 of FIG. 16).

The AP sends the registration request to the TVWS database 108 (block 1934). For example, the AP may send the registration request to the TVWS database 108 in the database request 202 (FIG. 2) using the format of the database registration frame 700 (FIG. 7). For instances when authentication is required, the AP sends the authentication-encapsulated registration request to the TVWS database 108 via the AAA server 1402 of FIG. 14.

The AP receives a database registration response from the TVWS database 108 (block 1936) and sends a response to the wireless terminal 114. For example, the AP may receive the database registration response from the TVWS database in the database response 204 of FIG. 2 based on a format according to the database response frame 1000 of FIG. 10 or the extended database response frame 1100. In addition, the AP may forward the information from the database registration response to the wireless terminal 114 in the AN response message 118 of FIGS. 1, 2, and 5. The contents of the database registration response may be an error/warning/informative code (e.g., success, registration denied, limited time use, etc.) from the TVWSP error/warning/info codes data structure 1200 of FIG. 12.

The wireless terminal 114 receives the database registration response (block 1940). If the registration was successful (block 1942) or if the TVWS database 108 does not require registration (block 1924), the wireless terminal 114 sends a request to access information in the TVWS database 108 to the AP (block 1944). In the illustrated example, the wireless terminal 114 can format and send the access request using the AN request message 116 of FIGS. 1, 2, and 4 based on the database request frame 800 of FIG. 8 as discussed above in connection with FIGS. 1, 2, 4, and 8. The request may be a request for TVWS connectivity information (e.g., the TVWS connectivity information 122 of FIG. 1) describing capabilities and requirements of one or more of the TVWS access networks 126*a-c* pertaining to the one or more locations specified by the wireless terminal 114 in the request. Alternatively, the request sent by the wireless terminal 114 may be any other type of request including one or more of the requests described above in connection with the request type values data structure 900 of FIG. 9.

The AP receives the request (e.g., the AN request message 116 of FIGS. 1, 2, and 4) (block 1928). If authentication is required (block 1930), the AP (or NAS) encapsulates the request in an authentication frame (e.g., one of the RADIUS TLV structure 1500 of FIG. 15 or the Diameter AVP structure 1600 of FIG. 16). The AP sends the request (e.g., the database request 202 of FIGS. 2 and 4) to the TVWS database 108 (block 1934) (in an authentication frame, if required), receives a response (e.g., the database response 204 of FIGS. 2 and 5) from the TVWS database 108 (block 1936), and sends a response (e.g., the AN response message 118 of FIGS. 1, 2, and 5) to the wireless terminal 114 (block 1938).

The wireless terminal 114 receives the response from the AP (block 1946) and stores (and/or uses) the information from the TVWS database 108 (block 1948). For example, if the received information is TVWS connectivity information for connecting to one of the TVWS access networks 126*a-c* (FIG. 1), the wireless terminal 114 can store the received TVWS connectivity information and subsequently (or immediately) use the TVWS connectivity information to connect to one of the TVWS access networks 126*a-c*. After storing/using the TVWS information (block 1948) or if the TVWS database registration was not successful (block 1942) or if the AP exchange communications with a TVWS database (block 1910), the example processes of FIG. 19 end.

Now turning to FIG. 20, the example flow diagram is representative of computer readable instructions that may be used to push TVWS connectivity information updates from the TVWS database 108 to a registered terminal (e.g., the wireless terminal 114 or any other TVBD) without needing the registered terminal to request such updated information. In the illustrated example of FIG. 20, example processes 2002 depict operations that may be performed by a wireless terminal (e.g., the wireless terminal 114 of FIGS. 1 and 2) or any other TVBD to register with the TVWS database 108 and receive broadcast or push updates therefrom. Example processes 204 depict operations that may be performed by the TVWS database 108 to register wireless terminals and push or broadcast TVWS connectivity information updates to registered wireless terminals.

Initially, the wireless terminal 114 requests to register with the TVWS database 108 (block 2006). The wireless terminal 114 may perform the registration request by sending a message (e.g., the AN request message 116 of FIGS. 1, 2, and 4) format in accordance with the database registration frame 700 (FIG. 7) to the WLAN AP 104 or any of the TVWS APs 128*a-c*. The TVWS database 108 receives and registers the wireless terminal 114 (block 2008). The TVWS database 108 sends a registration confirmation to the wireless terminal 114 (block 2010), and the wireless terminal 114 receives the registration confirmation (block 2012).

After some time, the TVWS database 108 receives TVWS access network connectivity parameter changes (block 2014). Such updated information may be received from one or more TVWS access networks (e.g., one or more of the TVWS access networks 126a-c of FIG. 1) in response to the one or more TVWS access networks detecting that it needs to change its connectivity parameters. For example, if a TVWS access network detects that a current one of its available channels will no longer be available (e.g., it is needed for another use such as broadcasting emergency, news information, operation of other wireless devices (e.g., wireless microphones) in the same or nearby frequencies, etc.), the TVWS access network can send such updated channel availability information to the TVWS database 108 for storing in the TVWS connectivity information 122. In some example implementations, the TVWS access network may also send time information along with the connectivity information update indicative of when the updated information will take effect and/or the duration for which the updated information will be valid.

The TVWS database 108 generates a message describing the TVWS access network connectivity parameter change(s) (block 2016) and pushes (or broadcasts) the message to registered terminals (block 2018). In the illustrated example of FIG. 20, the TVWS database 108 sends the message in an automated fashion without needing the registered terminals to request the updated information. In some example implementations, the TVWS database 108 may select to push the message only to those registered terminals to which the updated information is relevant. Such relevancy may be based on log information indicating which registered terminals previously requested to retrieve connectivity information for particular TVWS access networks. In the illustrated example, the wireless terminal 114 receives the message (block 2020) and stores and/or implements the TVWS access network connection changes (block 2022). For example, if the wireless terminal 114 is not connected to a TVWS access network corresponding to the received updated information, the wireless terminal 114 can store the information for future use. Otherwise, if the wireless terminal 114 is connected to the TVWS access network corresponding to the received updated information, the wireless terminal 114 can implement the changes by modifying its connection with the TVWS access network. The example processes of FIG. 20 then end.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
    receiving a request at a first access network, the request requesting network connectivity information for connecting a wireless terminal to a second access network;
    encapsulating the request in an authentication frame, the authentication frame indicating the request as a white space protocol frame; and
    sending the authentication frame to a database addressed in the request.

2. A method as defined in claim 1, wherein the request is received from the wireless terminal while the wireless terminal is in a non-associated state relative to the first access network.

3. A method as defined in claim 1, wherein the database is in an external network separate from the first access network.

4. A method as defined in claim 1, wherein the first access network is a first network type different from a second network type of the second access network.

5. A method as defined in claim 1, further comprising sending a response from the database to the wireless terminal via the first access network, the response including the network connectivity information for connecting the wireless terminal to the second access network.

6. A method as defined in claim 1, wherein the authentication frame is a Remote Authentication Dial In User Services (RADIUS) frame or a Diameter service frame.

7. A method as defined in claim 1, wherein the first access network is one of a wireless local area network, a cellular network, or a white space network, and wherein the second access network is a white space network.

8. An apparatus, comprising:
    a processor configured to at least:
    receive a request at a first access network, the request requesting network connectivity information for connecting a wireless terminal to a second access network;
    encapsulate the request in an authentication frame, the authentication frame indicating the request as a white space protocol frame; and
    send the authentication frame to a database addressed in the request.

9. An apparatus as defined in claim 8, wherein the processor is configured to receive the request from the wireless terminal while the wireless terminal is in a non-associated state relative to the first access network.

10. An apparatus as defined in claim 8, wherein the database is in an external network separate from the first access network.

11. An apparatus as defined in claim 8, wherein the first access network is a first network type different from a second network type of the second access network.

12. An apparatus as defined in claim 8, wherein the processor is further configured to send a response from the database to the wireless terminal via the first access network, the response including the network connectivity information for connecting the wireless terminal to the second access network.

13. An apparatus as defined in claim 8, wherein the authentication frame is a Remote Authentication Dial In User Services (RADIUS) frame or a Diameter service frame.

14. An apparatus as defined in claim 8, wherein the first access network is one of a wireless local area network, a cellular network, or a white space network, and wherein the second access network is a white space network.

15. A tangible machine readable storage device having instructions stored thereon that, when executed, cause a machine to at least:
    receive a request at a first access network, the request requesting network connectivity information for connecting a wireless terminal to a second access network;
    encapsulate the request in an authentication frame, the authentication frame indicating the request as a white space protocol frame; and
    send the authentication frame to a database addressed in the request.

16. A machine readable device as defined in claim 15, wherein the request is received from the wireless terminal while the wireless terminal is in a non-associated state relative to the first access network.

17. A machine readable device as defined in claim 15, wherein the database is in an external network separate from the first access network.

18. A machine readable device as defined in claim 15, wherein the first access network is a first network type different from a second network type of the second access network.

19. A machine readable device as defined in claim 15 having instructions stored thereon that, when executed, cause a machine to send a response from the database to the wireless terminal via the first access network, the response including the network connectivity information for connecting the wireless terminal to the second access network.

20. A machine readable device as defined in claim 15, wherein the authentication frame is a Remote Authentication Dial In User Services (RADIUS) frame or a Diameter service frame.

21. A machine readable device as defined in claim 15, wherein the first access network is one of a wireless local area network, a cellular network, or a white space network, and wherein the second access network is a white space network.

* * * * *